United States Patent
Lewicki et al.

(10) Patent No.: US 11,084,223 B2
(45) Date of Patent: Aug. 10, 2021

(54) OPTIMAL TOOLPATH GENERATION SYSTEM AND METHOD FOR ADDITIVELY MANUFACTURED COMPOSITE MATERIALS

(71) Applicants: Lawrence Livermore National Security, LLC, Livermore, CA (US); The Board of Trustees of the University of Illinois, Urbana, IL (US)

(72) Inventors: James Lewicki, Oakland, CA (US); William Compel, Oakland, CA (US); Daniel Tortorelli, Champaign, IL (US); Felipe Fernandez-Ayala, Pichincha (EC)

(73) Assignees: Lawrence Livermore National Security, LLC, Livermore, CA (US); The Board of Trustees of the University of Illinois, Urbana, IL (US)

( * ) Notice: Subject to any disclaimer, the term of this patent is extended or adjusted under 35 U.S.C. 154(b) by 70 days.

(21) Appl. No.: 16/105,459

(22) Filed: Aug. 20, 2018

(65) Prior Publication Data
US 2020/0055252 A1   Feb. 20, 2020

(51) Int. Cl.
*B29C 64/393* (2017.01)
*B33Y 50/02* (2015.01)
(Continued)

(52) U.S. Cl.
CPC ............ *B29C 64/393* (2017.08); *B33Y 50/02* (2014.12); *G06F 30/17* (2020.01); *G06T 17/20* (2013.01); *G06F 2111/06* (2020.01)

(58) Field of Classification Search
CPC .................................................. G06F 2111/06
(Continued)

(56) References Cited

U.S. PATENT DOCUMENTS

| 2015/0331402 A1 | 11/2015 | Lin et al. |
| 2015/0360288 A1 | 12/2015 | Zalewski |

(Continued)

FOREIGN PATENT DOCUMENTS

| JP | 2017-502430 A | 1/2017 |
| WO | WO-2017-189064 A1 | 11/2017 |

OTHER PUBLICATIONS

Jin et al., "An optimization approach for path planning of high-quality and uniform additive manufacturing" International Journal Adv. Manufacturing Technology, Iss. 92, 2017, pp. 651-662 (Year: 2017).*

(Continued)

*Primary Examiner* — Emilio J Saavedra
(74) *Attorney, Agent, or Firm* — Harness, Dickey & Pierce, P.L.C.

(57) ABSTRACT

The present disclosure relates to a system for optimizing an additive manufacturing (AM) process. The system may use a printing component for using a material to form a component in a layer-by-layer process. An electronic controller may control movement of one of the printing component or a substrate on which the component is being formed, in a manner to optimize a toolpath for the printing component as each layer of the component is formed. Optimization operations are performed using an optimization subsystem which enables manufacturability constraints, as well as optimized toolpaths for each layer of the component, to be defined using contours of a level-set function. The level-set function may be used to define the optimized toolpaths within a fixed, predetermined grid, and the optimized toolpaths then used to generate suitable code for controlling movement of the printing component relative to the substrate to create the part or structure in a layer-by-layer process, using the optimized toolpaths.

21 Claims, 21 Drawing Sheets

(51) Int. Cl.
    G06T 17/20    (2006.01)
    G06F 30/17    (2020.01)
    G06F 111/06   (2020.01)
(58) Field of Classification Search
    USPC .......................................................... 700/98
    See application file for complete search history.

(56) References Cited

U.S. PATENT DOCUMENTS

2017/0136703 A1    5/2017  Hayes et al.
2018/0157243 A1*   6/2018  Michopoulos ..... G05B 19/4099

OTHER PUBLICATIONS

Nguyen et al., "Isogeometric shape optimization of vibrating membranes" Computer Methods in Applied Mechanics and Engineering, 200(13-16), 2011, pp. 1343-1353 (Year: 2011).*
Cacace et al., "A level set based method for fixing overhangs in 3D printing" Applied Mathematical Modelling, 44, 2017, pp. 446-455 (Year: 2017).*
Liu et al., "A survey of Manufacturing oriented topology optimization methods" Advances in Engineering Software, Issue 100, 2016, pp. 161-175 (Year: 2016).*
Castelino et al., "Toolpath Optimization for Minimizing Airtime During Machining" Journal of Manufacturing Systems, vol. 22, No. 3, 2002, pp. 173-180 (Year: 2002).*
International Search Report and Written Opinion regarding International Application No. PCT/US2019/047255, dated Dec. 5, 2019.
Mostafa M. Abdalla and Zafer Gurdal. Structural design using optimality based cellular automata. In Proceedings of 43rd AIAA/ASME/ASCE/AHS/ASC Structures, Structural Dynamics, and Materials Conference, 2002.
Mostafa M. Abdalla, Shahriar Setoodeh, and Zafer Gurdal. Design of variable stiffness composite panels for maximum fundamental frequency using lamination parameters. Composite Structures, 81(2):283-291, 2007.
Samuel Amstutz, A. A. Novotny, and E. A. de Souza Neto. Topological derivative-based topology optimization of structures subject to Drucker-Prager stress constraints. Computer Methods in Applied Mechanics and Engineering, 233:123-136, 2012.
David L. Applegate, Robert E. Bixby, Vasek Chvatal, and William J. Cook. The traveling salesman problem: a computational study. Princeton university press, 2011.
Adriana W. Blom, Mostafa M. Abdalla, and Zafer Gurdal. Optimization of course locations in fiber-placed panels for general fiber angle distributions. Composites Science and Technology, 70(4):564-570, 2010.
Adriana W. Blom, Patrick B. Stickler, and Zafer Gurdal. Design and manufacture of a variable-stiffness cylindrical shell. In Proceedings of the SAMPE Europe 30th International Conference, 1-8.(2009). SAMPE Europe, 2009.
Adriana W. Blom, Brian F. Tatting, Jan M.A.M. Hol, and Zafer Gurdal. Fiber path definitions for elastically tailored conical shells. Composites part B: engineering, 40(1):77-84, 2009.
D. Brackett, I. Ashcroft, and R. Hague. Topology optimization for additive manufacturing. In Proceed-ings of the solid freeform fabrication symposium, Austin, TX, vol. 1, pp. 348-362. S, 2011.
C.J. Brampton, K.C. Wu, and H.A. Kim. New optimization method for steered fiber composites using the level set method. Structural and Multidisciplinary Optimization, 52(3):493-505, 2015.
Krzysztof Dems and Jacek Wi'sniewski. Optimal design of fiber-reinforced composite disks. Journal of Theoretical and Applied Mechanics, 47(3):515-535, 2009.
Andrew T. Gaynor and James K. Guest. Topology optimization for additive manufacturing: consider-ing maximum overhang constraint. In 15th AIAA/ISSMO multidisciplinary analysis and optimization conference, pp. 16-20, 2014.

Hassan Haddadpour and Zahra Zamani. Curvilinear fiber optimization tools for aeroelastic design of composite wings. Journal of Fluids and Structures, 33:180-190, 2012.
Ahmed Hussein, Liang Hao, Chunze Yan, Richard Everson, and Philippe Young. Advanced lattice support structures for metal additive manufacturing. Journal of Materials Processing Technology, 213(7):1019-1026, 2013.
Samuel Tsunduka IJsselmuiden. Optimal design of variable stiffness composite structures using lamina-tion parameters. PhD thesis, TUDelft, Oct. 2011.
Jukka-Pekka Jarvinen, Ville Matilainen, Xiaoyun Li, Heidi Piili, Antti Salminen, Ismo Makela, and Olli Nyrhila. Characterization of effect of support structures in laser additive manufacturing of stainless steel. Physics Procedia, 56:72-81, 2014. 8th International Conference on Laser Assisted Net Shape Engineering LANE 2014.
C.Y. Kiyono, E.C.N. Silva, and J.N. Reddy. A novel fiber optimization method based on normal distribution function with continuously varying fiber path. Composite Structures, 160:503-515, 2017.
Matthijs Langelaar. Topology optimization of 3d self-supporting structures for additive manufacturing. Additive Manufacturing, 12:60-70, 2016.
Matthijs Langelaar. An additive manufacturing filter for topology optimization of print-ready designs. Structural and Multidisciplinary Optimization, 55(3):871-883, Mar. 2017.
James P. Lewicki, Jennifer N. Rodriguez, Cheng Zhu, Marcus A. Worsley, Amanda S. Wu, Yuliya Kanarska, John D. Horn, Eric B. Duoss, Jason M. Ortega, William Elmer, et al. 3d-printing of meso-structurally ordered carbon fiber/polymer composites with unprecedented orthotropic physical properties. Scientific Reports, 7:43401, 2017.
Zhiwei Lin, Jianzhong Fu, Hongyao Shen, Wenfeng Gan, and Shuhua Yue. Tool path generation for multi-axis freeform surface finishing with the lkh tsp solver. Computer-Aided Design, 69:51-61, 2015.
Jikai Liu and Albert C. To. Deposition path planning-integrated structural topology optimization for 3d additive manufacturing subject to self-support constraint. Computer-Aided Design, 91:27-45, 2017. [33] Jikai Liu and Huangchao Yu. Concurrent deposition path planning and structural topology optimization for additive manufacturing. Rapid Prototyping Journal, 23(5):930-942, 2017.
J. H. Luo and H. C. Gea. Optimal orientation of orthotropic materials using an energy based method. Structural optimization, 15(3):230-236, Jun. 1998.
Fabio Luraghi. Surrogate-based shape optimization of fiber paths in tow-steered laminates for maximum buckling load. In Ferreira AJM, editor, 16th international conference on composite structures. University of Porto, Jun. 28-30, 2011.
S. Nagendra, Srinivas Kodiyalam, Jonathan Davis, and V. Parthasarathy. Optimization of tow fiber paths for composite design. In AIAA/ASME/ASCE/AHS/ASC 36th Structures, Structural Dynamics and Materials Conference, pp. 2261-2269, 1995.
Reynaldo Olmedo and Zafer Gurdal. Buckling response of laminates with spatially varying fiber orientations. In AIAA/ASME/ASCE/AHS/ASC 34th Structures, Structural Dynamics, and Materials Conference, pp. 2261-2269, 1993.
Levend Parnas, Suha Oral, and U mit Ceyhan. Optimum design of composite structures with curved fiber courses. Composites science and technology, 63(7):1071-1082, 2003.
Jeffrey Roberge and Julian Norato. Computational design of curvilinear bone scaffolds fabricated via direct ink writing. Computer-Aided Design, 2017.
Shahriar Setoodeh, Mostafa M. Abdalla, Samuel T. IJsselmuiden, and Zafer Gurdal. Design of variable-stiffness composite panels for maximum buckling load. Composite Structures, 87(1):109-117, 2009.
Shahriar Setoodeh, Adriana W. Blom, Mostafa M Abdalla, and Zafer Gurdal. Generating curvilinear fiber paths from lamination parameters distribution. In Proceedings of the 47th AIAA/ASME/ASCE/AHS/ASC Structures, Structural Dynamics and Materials (SDM) Conference. Newport, RI, 2006.

(56) References Cited

OTHER PUBLICATIONS

Shahriar Setoodeh, Zafer Gurdal, and Layne T. Watson. Design of variable-stiffness composite layers using cellular automata. Computer Methods in Applied Mechanics and Engineering, 195(9):836-851, 2006.

Brian F. Tatting. Analysis and design of variable stiffness composite cylinders. PhD thesis, Ph. D. Thesis, Virginia Polytechnic Institute and State University, Blacksburg, Virginia, USA, 1998.

Brian F. Tatting, Zafer Gurdal, and Dawn Jegley. Design and manufacture of elastically tailored tow placed plates. Technical Report CR-211919, NASA, Aug. 2002.

D. A. Tortorelli and P. Michaleris. Design sensitivity analysis: Overview and review. Inverse Problems in Engineering, 1(1):71-105, 1994.

Charles L. Tucker III and Erwin Liang. Stiffness predictions for unidirectional short-fiber composites: Review and evaluation. Composites Science Technology, 59(5):655-671, 1999.

Julien M.J.F. Van Campen, Christos Kassapoglou, and Zafer Gurdal. Generating realistic laminate fiber angle distributions for optimal variable stiffness laminates. Composites Part B: Engineering, 43(2):354-360, 2012.

Chris Waldhart. Analysis of tow-placed, variable-stiffness laminates. Master's thesis, Virginia Polytechnic Institute and State University, 1996.

Chris Waldhart, Zafer Gurdal, and Calvin Ribbens. Analysis of tow placed, parallel fiber, variable stiffness laminates. In 37th Structure, Structural Dynamics and Materials Conference, p. 1569, 1996.

Zhangming Wu, Paul M Weaver, Gangadharan Raju, and Byung Chul Kim. Buckling analysis and optimisation of variable angle tow composite plates. Thin-walled structures, 60:163-172, 2012.

Changxue Xu, Wenxuan Chai, Yong Huang, and Roger R. Markwald. Scaffold-free inkjet printing of three-dimensional zigzag cellular tubes. Biotechnology and bioengineering, 109(12):3152-3160, 2012.

Zahra Zamani, Hassan Haddadpour, and Mohammad-Reza Ghazavi. Curvilinear fiber optimization tools for design thin walled beams. Thin-Walled Structures, 49(3):448-454, 2011.

* cited by examiner

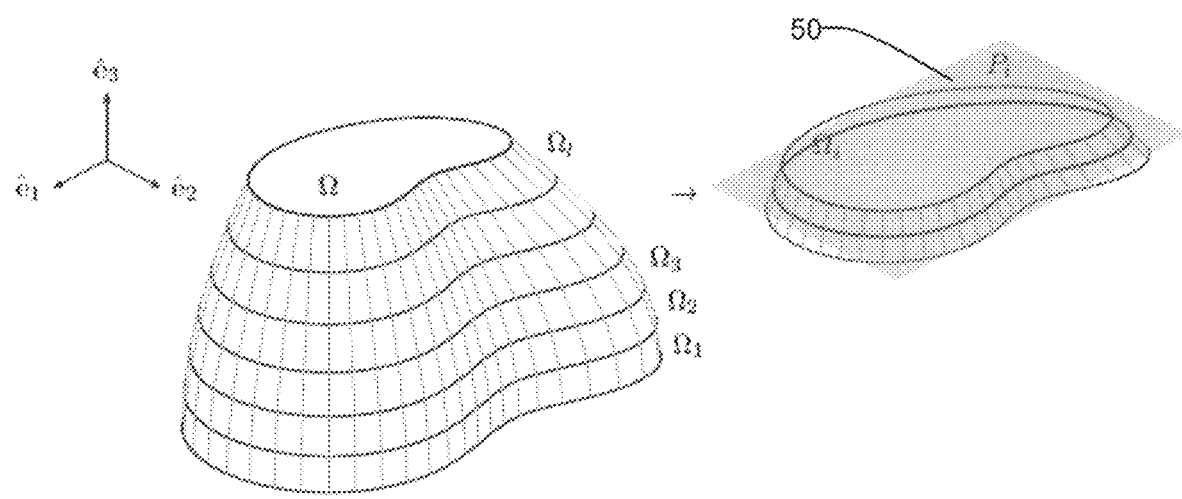
FIGURE 2
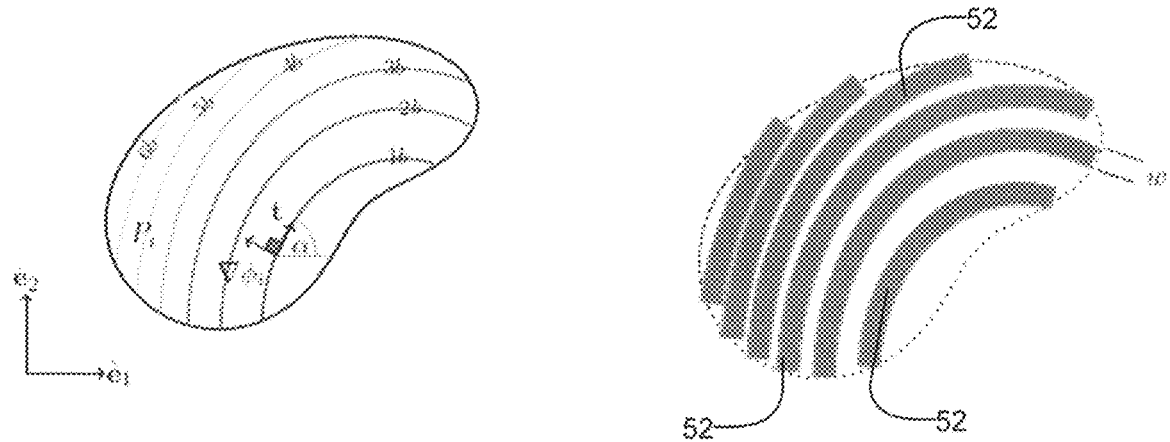
FIGURE 3A
FIGURE 3B

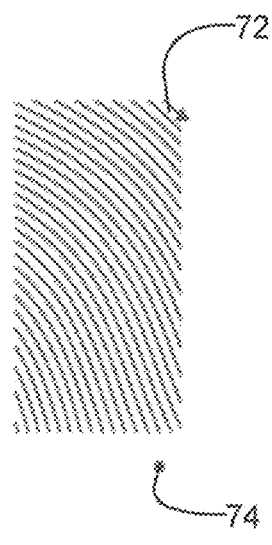 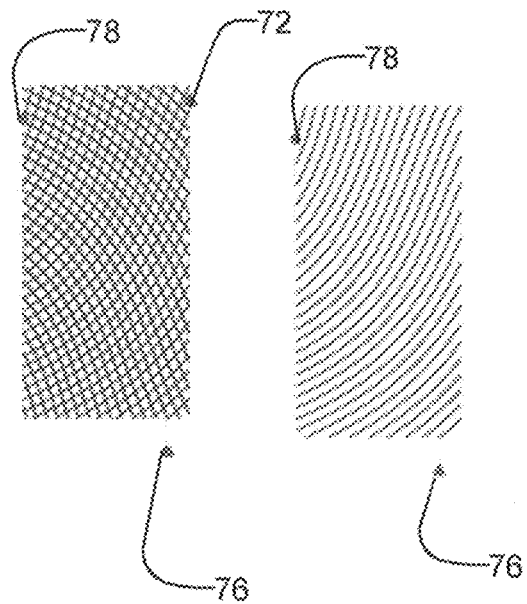
FIGURE 17C  FIGURE 17D  FIGURE 17E
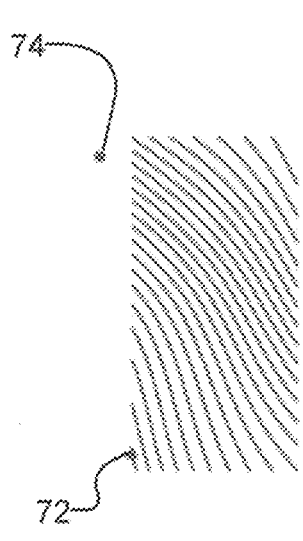 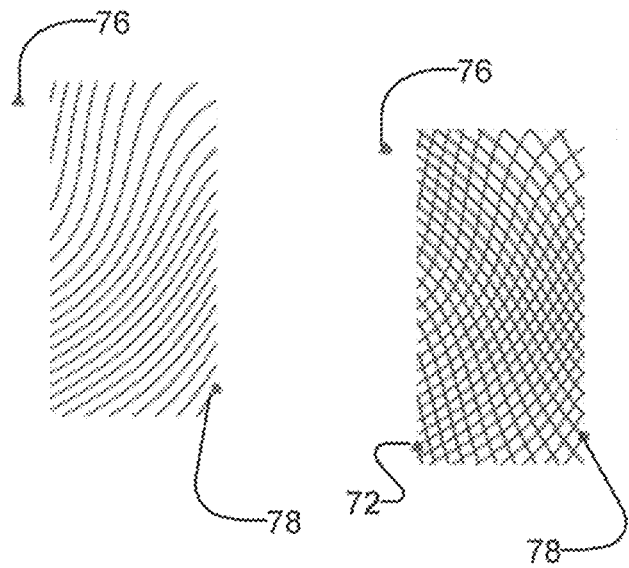
FIGURE 18C  FIGURE 18D  FIGURE 18E Table 1: Optimal short beam

| $V_{max}$ | $c/c_0$ | It. |
|---|---|---|
| 1.00 | 0.82326 | 86 |
| 0.90 | 0.84727 | 50 |
| 0.80 | 0.92063 | 49 |
| 0.70 | 1.07301 | 30 |
| 0.60 | 1.09130 | 31 |
| 0.50 | 1.28922 | 59 |
| 0.40 | 1.80676 | 84 |

FIGURE 19F

Table 2: Optimal long cantilever beam $v_{max} = 0.7$

| $\epsilon_{tol}$ | $10^{-3}$ | | $10^{-4}$ | |
|---|---|---|---|---|
| Stack | $c/c_0$ | It. | $c/c_0$ | It. |
| ABCD | 1.23859862623954 | 41 | 1.23612682242862 | 268 |
| ABCA | - | - | - | - |
| ABCB | 1.25495144468570 | 28 | 1.24508208865326 | 342 |
| ABAC | 1.25125151335706 | 36 | 1.24442795869873 | 561 |
| ABAB | 1.24637432517875 | 104 | 1.24034299153136 | 669 |

FIGURE 21A

OPTIMAL TOOLPATH GENERATION SYSTEM AND METHOD FOR ADDITIVELY MANUFACTURED COMPOSITE MATERIALS

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to additive manufacturing systems and methods, and more particularly to systems and methods for generating an optimal toolpath for a tool used by an additive manufacturing system.

BACKGROUND

This section provides background information related to the present disclosure which is not necessarily prior art.

Composite materials are integral in the design of countless types of structures due to their excellent mechanical properties. Indeed, the mechanical properties of composite materials are designed to be superior to those of their individual constituent materials. But realizing this benefit requires the optimal placement of the constituents of a composite material within the composite material so as to tailor the material properties for optimal structural performance. And now, Additive Manufacturing (AM) technology can do just this by building up structures, layer-upon-layer, by depositing various materials including Fiber Reinforced Composites (FRC). Therefore, it is expected that the popularity of composites will continue to increase over the coming years. This is especially so since AM processes enable optimum placement of the constituents, as well as rapid, inexpensive, small volume processing.

Structural optimization of laminated composite structures has been studied extensively. Problems have been solved to find optimal shape, thickness, number of plies, and/or stacking sequence of the laminates so as to maximize stiffness, failure load, etc. These challenging problems are often nonlinear, non-convex, multi-modal, multi-dimensional and can be expressed with discrete and/or continuous design variables. To solve these problems, researchers have used gradient-based, direct search, heuristic, and hybrid optimization techniques. In general, gradient-based methods are the most efficient although they only find local minimums. Unfortunately many optimized composite structures are not practical because current structural optimization software does not accommodate manufacturing constraints imposed by an AM process. Therefore, substantial modifications are imposed on the optimized designs to make them manufacturable and, as a result, non-optimal. To make matters even more challenging, Topology Optimized (TO) designs are geometrically complex and difficult to manufacture with traditional manufacturing processes. Fortunately, AM has the capacity to accommodate such complexities, however, there are still restrictions. To these ends, research in TO for isotropic materials has incorporated AM constraints that quantify minimum feature size, maximum feature size, self-support requirements, and build direction. Quantifying support structure constraints is an especially active research topic. This is because support structures serve as building platforms and heat sinks that reduce residual stress and deformation (e.g., distortion/curling). However, supports also increase manufacturing effort and cost. Moreover, some challenges like the anisotropy induced by the layer-by-layer AM fabrication process, and the intrinsic anisotropy of the material, warrant additional research.

Additional research must further integrate TO designs with their manufacturing processes. For instance, TO designs require conversion to transform them to Stereo Lithography (STL) Computed Aided Design (CAD) models. Then, another software slices these CAD models into layers and generates the AM printer commands into a suitable code, for example, G-code. G-code is presently the prominent programming language used in Computer Numerical Control (CNC) machines.

It is also important to comment on some manufacturing considerations of composite structures fabricated via AM, autoclave molding, filament winding, Automated Tape Laying (ATL), Advance Fiber Placement (AFP), and resin transfer molding processes. AM, ATL and AFP technologies allow for curvilinear fiber paths, offering structures with greater potential for mechanical performance improvements verses straight fiber laminates. As expected, however, curvilinear paths require more manufacturing restrictions than straight fiber laminates. These restrictions include constraints on path continuity, gaps, overlaps, maximum curvature, minimum cut length, fiber angle deviation, jagged boundaries and fiber bridging.

The structural optimization begins by discretizing the structure by finite elements. In the most naive approaches, the fiber orientation is optimized in each element. However, rapid changes of the optimized fiber orientations produce discontinuous fiber paths which cannot be manufactured. To combat this, a post-processing step is required to produce continuous and manufacturable fiber paths that best fit the optimized fiber orientations; this is not straight forward. To improve fiber path continuity, Abdalla et al., *Structural Design Using Optimality Based Cellular Automata*. In Proceedings of 43$^{rd}$ AIAA/ASME/ASCE/AHS/ASC Structures, Structural Dynamics, and Materials Conference, 2002; Abdalla et al., *Design of Variable Stiffness Composite Panels for Maximum Fundamental Frequency Using Lamination Parameters*. Composite Structures, 81, No. 2, 2007, pp. 283-291; Setoodeh et al., In Proceedings of the 47$^{th}$ AIAA/ASME/ASCE/AHS/ASC Structures, Structural Dynamics and Materials (SDM) Conference, Newport, R.I., 2006, use classical lamination theory and define the elasticity coefficients in terms of four nodal lamination parameters. The stiffness of the laminate is continuous, however a post-processing technique is required to obtain the fiber orientations. Setoodeh et al., *Generating Curvilinear Fiber Paths From Lamination Parameters Distribution*, In Proceedings of the 47$^{th}$ AIAA/ASME/ASCE/AHS/ASC Structures, Structural Dynamics and Materials (SDM) Conference, New Port, R.I., 2006 and Blom et al., *Optimization of Course Locations in Fiber-Placed Panels for General Fiber Angle Distributions*, Composites Science and Technology, 70(4): 564-570, 2010) retrieve the fiber paths from the stiffness distribution in a post-processing step using a curve fitting technique that imposes a curvature constraint. Later, Setoodeh et al., *Design of Variable-Stiffness Composite Layers Using Cellular Automata*, Computer Methods in Applied Mechanics and Engineering, 195(9):836-851, 2006, use nodal rather than elemental fiber orientation parameters to obtain a continuous fiber orientation, however the spatial derivatives and thus fiber curvature is discontinuous across the element edges. They also propose a heuristic pattern matching technique to improve manufacturing issues. Again in a post-processing technique, Blom et al., use a streamline method to generate continuous fiber paths from the fiber orientation distribution. Kiyono et al., *A Novel Fiber Optimization Method Based on Normal Distribution Function With Continuously Varying Fiber Path*, Composite Structures, 160:503-515, 2017, filter the orientation distribution to improve smoothness, however the fiber paths are still discontinuous due to the element-based discretization.

To ensure continuous fiber paths, researchers have replaced the finite element based fiber orientation description with functional representations, for example, NURBS, Lagrangian polynomials, Bezier curves, constant angle and constant curvature paths. To overcome overlaps issues, Tatting et al., *Design and Manufacture of Elastically Tailored Tow Placed Plates*, Technical Report CR-211919, NASA, August 2002, use a post-processing tow-dropping method, however this creates small wedge-like gap regions. Waldhart et al., *Analysis of Tow-Placed, Variable-Stiffness Laminates*, Master's Thesis, Virginia Polytechnic Institute and State University, 1996 and Waldhart et al., *Analysis of Tow Placed, Parallel Fiber, Variable Stiffness Laminates*, In 37th Structure, Structural Dynamics and Materials Conference, p. 1569, 1196, define the fiber path by a curve that is parameterized by a single variable allowing them to satisfy a maximum curvature constraint. Other researchers define a point-wise curvature constraint via a single global maximum curvature violation constraint. However, it is well known that the non-differentiable max function produces numerical issues which inhibit the effectiveness of gradient-based optimization algorithms.

Brampton et al., *New Optimization Method for Steered Fiber Composites Using the Level Set Method*, Structural and Multidisciplinary Optimization, 52(3): 493-505, 2015, proposed a level-set method to describe continuously varying fiber paths that can be manufactured with AFP technology. This approach defines a primary fiber path as the zero level-set. Adjacent fiber paths are obtained from the primary path using the "fast marching" method. This extrapolation obtains evenly spaced fiber paths, but discontinuities can appear, reducing manufacturability. The zero level-set, i.e., design, is updated with a Hamilton-Jacobi formulation using approximate sensitivities that are obtained using an energy based method. The inefficiency of the Hamilton-Jacobi formulation, and the approximated sensitivities, result in an optimization algorithm that convergences slowly and is highly dependent on the initial design, however, there is much potential offered from the level-set method.

Roberge and Norato, *Computational Design of Curvilinear Bone Scaffolds Fabricated Via Direct Ink Writing*, Computer-Aided Design, 2017, use element path spacing and orientation parameters to optimize curvilinear scaffolds that are fabricated via Direct Ink Writing (DIW). To obtain manufacturable toolpaths, they transform the path spacing and orientation distribution into a scalar field whose level-set contours represent the toolpaths. This post-processing transformation uses linear least squares and a smoothing filter. Liu and Yu, *Concurrent Deposition Path Planning and Structural Topology Optimization For Additive Manufacturing*, Rapid Prototyping Journal, 23(5):930-942, 2017, integrate TO with the level-set description for path planning in the AM process. The zero level-set is interpreted as the domain boundary, and level-set contours in the domain are interpreted as the deposition paths. A heuristic multi-step algorithm is required to overcome issues related to approximated sensitivities. Liu and To, *Deposition Path Planning-Integrated Structural Topology Optimization For 3d Additive Manufacturing Subject to Self-Support Constraint*," Computer-Aided Design, 91:27-45, 2017, extended this work to three-dimensional structures subject to self-support constraints wherein a multi-level-set interpolation ensures that the upper layers are supported by the lower layers. Again, due to sensitivity approximations, the optimization algorithm exhibits poor convergence.

All these post-process, yield fabricated parts suffer in that they do not match the original TO designs, and therefore optimality is compromised.

SUMMARY

This section provides a general summary of the disclosure, and is not a comprehensive disclosure of its full scope or all of its features.

In one aspect the present disclosure relates to a system for optimizing an additive manufacturing (AM) process. The system may comprise a printing component for using a material to form a component in a layer-by-layer process, and a motion control subsystem for controlling movement of at least one of the printing nozzle or a substrate on which the component is being formed. An electronic controller may be included for controlling the movement of one of the printing component or a substrate on which the component is being formed, in a manner to optimize a toolpath for the printing component as each layer of the component is formed. An optimization subsystem may be included to enable manufacturability constraints of a printing process to be defined, to define optimized toolpaths for each layer of the component using contours of a level set function, and to use the optimized toolpaths to generate code for controlling movement of the printing component relative to the substrate. The electronic controller may further be configured to use the code to control the motion control subsystem to move one of the printing component or the substrate, in accordance with the optimized toolpaths, to create the component in a layer-by-layer operation.

In another aspect the present disclosure relates to a system for optimizing an additive manufacturing (AM) process. The system may comprise a printing nozzle for printing a flowable material to form a component in a layer-by-layer printing process, and a motion control subsystem for controlling movement of at least one of the printing nozzle or a substrate on which the component is being formed. An electronic controller may also be included for controlling the movement of one of the printing nozzle or a substrate on which the component is being formed, in a manner to optimize a toolpath for the printing nozzle as the flowable material is deposited on the substrate or on a previously formed layer. An optimization subsystem to may be included to enable manufacturability constraints of a printing process to be defined. The optimization subsystem may also be used to define optimized toolpaths for each layer of the component using contours of a level set function, and to define the level set function with a set of control points and polynomial functions that are defined within a fixed grid. Still further, the optimization subsystem may be used to generate the optimized toolpaths for each layer in part by carrying out an initialize angle optimization operation which includes defining optimization parameters including at least one of tolerances, a maximum number of iterations and a minimum spacing between adjacent ones of the optimized toolpaths, and wherein the initialize angle optimization operation further comprises defining an initial angle orientation for each one of a plurality of predetermined number of layers of the component. The optimization subsystem may further be configured to use angle and spacing of the level-set function to define DIW constraints including at least one of: no overlapping toolpath with minimum separation; no turns exceeding a minimum radius of curvature; and a constraint to minimize sagging of the flowable material after initially being deposited by the printing nozzle. The electronic controller may be further configured to use the code to control the motion control subsystem to move one of the printing nozzle or the substrate, in accordance with the optimized toolpaths, to create the component in a layer-by-layer operation.

In still another aspect the present disclosure relates to a method for carrying out and optimizing an additive manufacturing (AM) process. The method may include using an electronic controller to control movement of one of a printing component or a substrate, in a manner to optimize a toolpath for the printing component as the printing component forms a layer of a component. The method may further include using an optimization subsystem to:

enable manufacturability constraints of a printing process to be defined;

define optimized toolpaths for each layer of the component using contours of a level set function, wherein the level set function is defined using a fixed, predetermined grid;

use the optimized toolpaths to generate code for controlling movement of the printing nozzle relative to the substrate; and to cause the electronic controller to use the code to control movement of one of the printing component or the substrate, in accordance with the optimized toolpaths, to create the component in a layer-by-layer operation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. In the drawings:

FIG. 2 illustrates how a structural domain of a component to be formed may be initially sliced into a predetermined number of layers from the bottom to the top of the structural domain;

FIG. 3A shows an example of a plurality of curves of a level-set function $\phi_i$;

FIG. 3B shows a top view of the curves defined by the level-set function in FIG. 3A but showing the width (w) of deposited material along each curve;

FIGS. 17C and 17D show connected toolpaths which each form a continuous toolpath, with $v_{max}=1.0$; and FIG. 17E shows juxtaposed toolpaths for the short cantilever problem, with $v_{max}=1.0$;

FIGS. 18C and 18D show connected toolpaths with $v_{max}=0.8$; and

FIG. 18E shows juxtaposed toolpaths for the short cantilever beam problem with $v_{max}=0.8$;

FIG. 19F shows a table associated with results for the optimal short beam;

FIG. 21A is a table (Table 2) of compliances and the number of design iterations for each one of the 5 stacking sequences associated with the beam of FIG. 21;

FIGS. 23A and 23B illustrate an optimal continuous toolpath for each of layers A and B of the beam of FIG. 21, while

FIG. 28B shows juxtaposed toolpaths for layers A and B for the two-hole plate problem;

Corresponding reference numerals indicate corresponding parts throughout the several views of the drawings.

DETAILED DESCRIPTION

Example embodiments will now be described more fully with reference to the accompanying drawings.

The present disclosure describes a method for optimizing additively manufactured structures (e.g., parts) fabricated by using an AM process that accommodates manufacturability constraints of the process of choice. In the case of the examples outlined herein, that process is Direct Ink Writing (DIW), although as noted above, the present disclosure is not limited to use of only a DIW process. The embodiments and methods described herein maintain computational efficiency and virtually guarantee optimality of the finished 3D part.

The toolpaths of each layer of the part may be defined by the contours of a level-set function. With this parametrization, the toolpaths are continuous and defined with a small number of design variables in a fixed grid independent of the finite element mesh used for structural analysis. The toolpath spacing, angle and curvature are defined with the gradient of the level-set function. In this way, it is easy to impose DIW manufacturing constraints such as no overlap, no sag of just-printed material, minimum radius of curvature of each toolpath, and toolpath continuity. For each layer, these local constraints are enforced globally, using a ramp function, resulting in a small number of constraints.

The DIW toolpaths affect the orientation of the reinforce fibers in the flowable material passing through the printing nozzle, and hence the structural response of the composite structure. The material properties, i.e., the volume fraction and elastic stiffness, are modeled using the level-set function parametrization. This allows computation of a structure's mass and compliance as well as its design sensitivities via the finite element method. This is combined with nonlinear programming to efficiently update the design parameters and find locally optimal solutions.

The optimized toolpaths start and finish at the boundary of each layer. To minimize manufacturing cost, the system formulates and solves a Travelling Salesman Problem ("TSP") to obtain the shortest continuous toolpath for each layer that avoids overlap and crossing holes. This continuous toolpath is subsequently used to generate the G-code for the CNC fabrication.

The efficacy of the approach described herein has been validated through specific examples by obtaining minimum compliance composite structures, which can be fabricated, and by results which have been validated by fabrication and testing.

Figure 1:
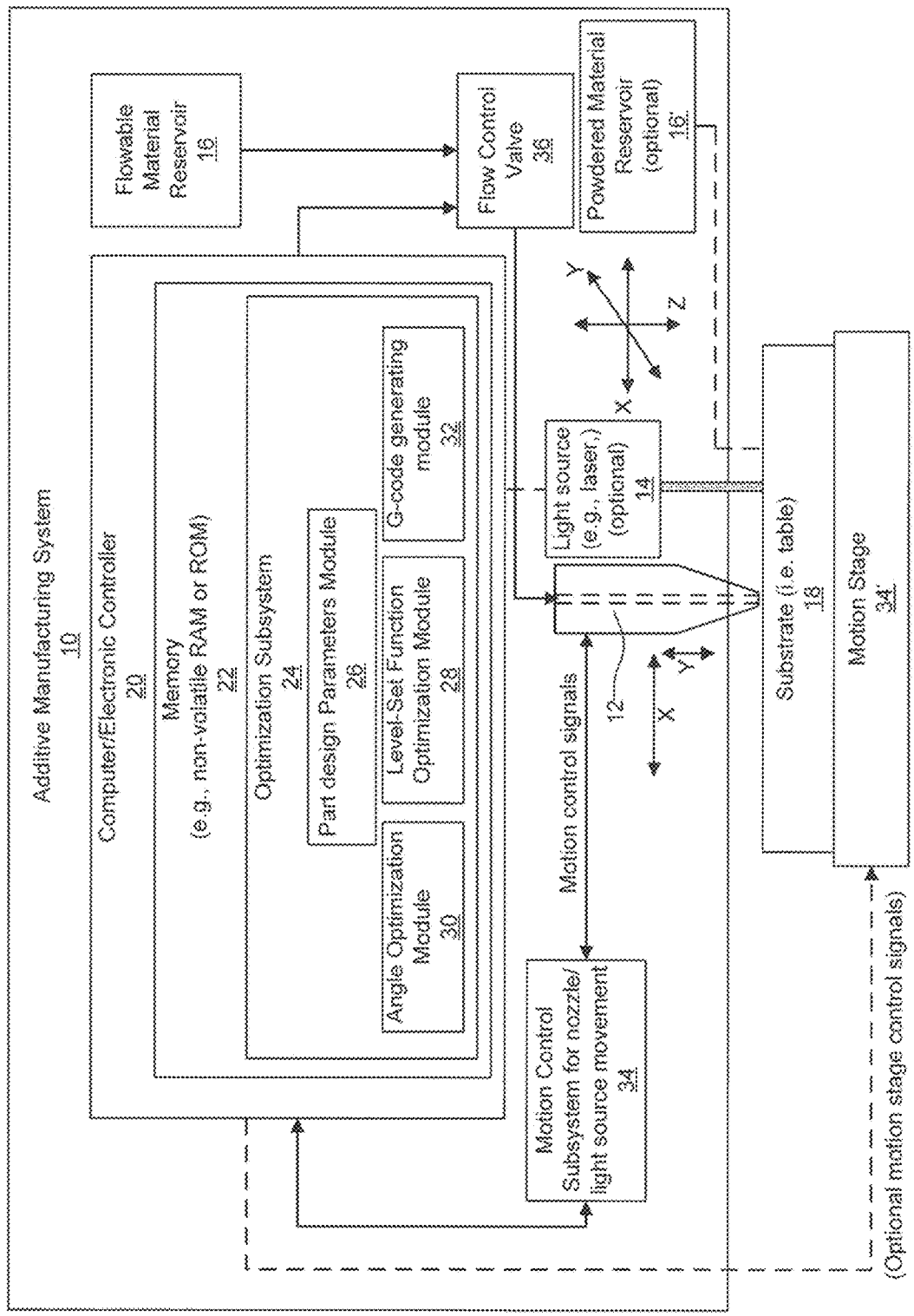
FIG. 1 is a high level block diagram illustrating various components of one embodiment of a system in accordance with the present disclosure, which forms a Direct Ink Write ("DIW") system, along with optional components that may be used to implement the system as a Selective Laser Sintering ("SLS") type system.

Referring to FIG. 1 there is shown an additive manufacturing system 10 in accordance with one embodiment of the present disclosure. The system 10 in one embodiment forms a "Direct Ink Write" ("DIW") system in which a flowable material, for example a heated, printable material (e.g., molten metallic ink) or a chemically activated (e.g., fiber reinforced thermoset composite which in either case is flowable, is passed (i.e., extruded) through a printing component, for example a nozzle 12. The flowable material may be printed directly on a substrate 18 or on a previously formed material layer. In such an embodiment a flowable material reservoir 16 may be included to supply the flowable material to the printing nozzle 12. The printing nozzle 12 may be used to form each layer of a structure or part, in a layer-by-layer process, starting with an initial layer deposited on the substrate 18. In another embodiment, the system 10 may be implemented as a Selective Laser Sintering ("SLS") system in which a powdered material (e.g., powdered metal) reservoir 16' is used to deposit a layer of powdered material on the substrate 18 or on a previously formed material layer. When the system 10 is implemented as an SLS system, a light source, for example a laser 14 (or optionally an infrared or UV diode light source), may take the place of the printing nozzle 12 and may be used to heat select portions of each layer of powdered material to selectively fuse portion of the powdered material layer to form the part in a layer-by-layer operation on the substrate 18. Both DIW and SLS systems may be implemented using the teachings of the present disclosure as set forth herein. Simply for convenience, however, the following discussion will refer to the system 10 as a DIW system. It will be appreciated that the teachings presented herein are applicable to virtually any type of additive manufacturing system with little or no modifications. It will also be appreciated that the following discussion may refer to the article being formed as a "component", a "part" or a "structure", with it being understood that these terms are used interchangeably to denote any form of 3D article.

Referring further to FIG. 1, the system 10 may include an electronic controller 20 having a non-volatile memory 22 (e.g., RAM or ROM). The memory 22 may form an integrated portion of the electronic controller 20 or may be a separate component in communication with the electronic controller. The memory 22 may include an optimization subsystem 24 for determining optimum toolpaths for the nozzle 12 as the nozzle is used to form each layer of the part. The optimization subsystem 24 may include a module for part design parameters 26 which may be parameters input by a designer (e.g., strength, density, et al.) for the part to be formed. Additional modules may be an angle optimization module 30, a level set optimization module 28, and a G-code generating module 32. The operations of these modules will be described more fully in the following paragraphs.

The system 10 may also include a motion control subsystem 34 for controlling movement of the nozzle 12 or the laser 14, assuming the substrate 18 is held stationary during the formation of each layer of the part, or alternatively a motion stage 34' which may be controlled for movement in an X-Y coordinate system while the nozzle 12 (or light source such as laser 14) is held stationary. Optionally, both the nozzle 12 (or the light source, for example laser 14) and the motion stage 34' may be controlled for movement during the formation of each layer of the part. It is anticipated, however, that in many implementations, it may be preferred to use the motion stage 34' to move the substrate 18 as needed while the nozzle 12 (or laser 14) is held stationary.

The electronic controller 20 may also control opening and closing of a flow control valve 36 to admit the flowable material into the nozzle 12 during a DIW process. Optionally, the electronic controller 20 could control a separate valve (not shown) to control depositing of the powdered material from the powdered material reservoir 16' onto the substrate 18 as each new layer of the part is formed using a SLS system.

The system 10 and method described herein is able to optimize the design of fiber reinforced composite (FRC) structures that are amenable to an AM process. The present disclosure, in one specific implementation described herein, uses DIW wherein FRC is extruded through the moving nozzle 12 of the AM system 10 and quickly cured or semi-cured on the substrate 18, thereby forming the structure. During the extrusion, the fibers of the FRC orient themselves with the flow direction. And since the stiffness of the FRC is significantly higher in the fiber direction, this provides the ability to tailor the structural properties by tailoring the toolpath (i.e., nozzle) trajectory. However, not all toolpaths are realizable. For example, an important limitation is that the toolpath cannot change direction abruptly, and the toolpaths on each layer cannot overlap.

To accommodate the DIW fabrication restrictions, the present disclosure defines the toolpaths of each printed layer of the part by the contours of a level-set function. The level-set surface is defined from a B-surface and the heights of the B-surface control points serve as the design variables in the optimization. This parametrization allows the DIW constraints and the structural mass and stiffness to be explicitly defined. This technique is applied to minimize the compliance of FRC three-dimensional structures fabricated via DIW. A sensitivity analysis is performed with respect to the level-set parametrization, making it amenable to gradient-based optimization algorithms. As such, the present disclosure does not use level-set method techniques like Hamilton-Jacobi update formulation and fast marching methods to update the design. Rather, the present disclosure uses a nonlinear programming optimizer so as to attain fast convergence and verify satisfaction of the optimality conditions.

With the methods of the present disclosure, the optimal toolpaths for an optimized design start and stop at the domain boundary. To enable the DIW process, these start and stop points are linked together to form a continuous path. And to minimize manufacturing time, it is important that the shortest path is obtained. To these ends, the present disclosure formulates and solves a Traveling Salesman Problem (TSP). Having the layer toolpaths, the present disclosure is able to easily generate the G-code with their coordinates. Optimized designs can then be readily validated via fabrication and testing.

Section 1.0 Toolpath Parametrization Using Level-Sets

The system 10 of FIG. 1 implements a DIW process to print the structural domain n layer-by-layer, from bottom to top, for a 3D part. Essentially, the optimization subsystem 24 (i.e., level-set function optimization module 28) slices the structural domain $\Omega$ into $n_l$ layers of thickness "h" to form the layer domains, $\Omega_1, \Omega_2, \ldots, \Omega_l$, that are stacked in the $\hat{e}_3$ direction, as shown in FIG. 2, such that $\Omega_i = \{x \in \Omega | (i-1) h < x \cdot \hat{e}_3 < i\, h\}$.

The toolpaths are defined for the layer $\Omega_i$ at its mid-plane $P_i = \{x \in \Omega_i | x \cdot \hat{e}_3 = (i-1)h + h/2\}$, as defined by shaded region 50 in FIG. 2. The toolpath centerlines $C_i^k$ for each layer $\Omega_i$ are represented implicitly by the contours of a level-set function $\phi_i$ $$C_i^k = \{x | \phi_i(x) = kb\}, k \in \mathbb{Z}. \quad \text{(Equation 1)}$$

The contours that define the toolpaths are multiples of an arbitrary parameter "b". In FIG. 3A, a set of contours $\phi(x) = 1b, 2b, \ldots, 6b$, is shown where each contour represents a different level. In FIG. 3B, one can see how the deposited material 52 of width w will look from the top view if we follow the toolpaths represented by these contours. For convenience and without loss of generality, we choose b=w.

The level-set function $\phi_i: \mathbb{R}^2 \rightarrow \mathbb{R}$ for the layer $\Omega_i$ is defined over the plane $P_i$ by:

$$\phi_i(x) = \hat{N}(x)^T d_i \quad \text{(Equation 2)}$$

where the vector of basis functions is:

$$\hat{N}(x) = [\hat{N}_1(x), \hat{N}_2(x), \ldots, \hat{N}_n(x)]^T \in \mathbb{R}^n, \quad \text{(Equation 3)}$$

and the vector of control point height parameters, which serve as the design variables in the optimization, is:

$$d_i = [d_{i1}, d_{i2}, \ldots, d_{in}]^T \in \mathbb{R}^n. \quad \text{(Equation 4)}$$

As discussed in the following section Section 2 on "DIW Constraints", to accommodate the DIW constraints, we require $C^2$-continuous toolpaths, i.e., level-set functions. Cubic B-splines are $C^2$-continuous curves defined with piecewise cubic polynomials. Thus, we represent the level-set functions using B-surfaces constructed with bi-cubic B-splines. For convenience, we define the B-surface over a fixed rectangular grid of control points. In this way, it is independent of the finite element mesh that will eventually be used for structural analysis. Additionally, large changes in the curves and topological changes do not require the addition or subtraction of control points as opposed to explicit curve definitions. As such, the present methodology drastically reduces the number of design variables versus finite element based parameterization schemes, and ensures that the toolpaths on each layer are smooth and well (i.e., adequately) spaced.

As will be appreciated, the toolpath orientation is a function of the level-set function. To see this, we define derivatives of the basis functions as $\hat{B}_1 = (\partial \hat{N}/\partial x_1)^T$ and $\hat{B}_2 = (\partial \hat{N}/\partial x_2)^T$, and calculate the gradient of the level-set function by:

$$\nabla \phi_i(x) = \begin{bmatrix} \dfrac{\partial \phi_i(x)}{\partial x_1} \\ \dfrac{\partial \phi_i(x)}{\partial x_2} \end{bmatrix} = \begin{bmatrix} \hat{B}_1(x) \\ \hat{B}_2(x) \end{bmatrix} d_i. \quad \text{(Equation 5)}$$

Next, we let $r_i^k(t)$ be any parameterization of the toolpath $C_i^k$. By the chain rule $d\phi_i(r_i^k(t))/dt = \nabla \Delta_i(r_i^k(t)) \cdot dr_i^k(t)/dt = 0$, which implies $\nabla \phi_i(r_i^k)$ is perpendicular to the path tangent vector $t_i^k(t) = dr_i^k(t)/dt$ (see FIG. 3a), where:

$$t_i^k(t) = \dfrac{1}{|\nabla \phi_i(r_i^k(t))|} \begin{bmatrix} \dfrac{\partial \phi_i(r_i^k(t))}{\partial x_2} \\ -\dfrac{\partial \phi_i(r_i^k(t))}{\partial x_1} \end{bmatrix} = \dfrac{1}{|\nabla \phi_i(r_i^k(t))|} \begin{bmatrix} \hat{B}_2(r_i^k(t)) \\ -\hat{B}_1(r_i^k(t)) \end{bmatrix} d_i. \quad \text{(Equation 6)}$$

The toolpath orientation angle α is given by the inclination of "t" with respect to the $\hat{e}_1$ axis as seen in FIG. 3A, i.e., $$\alpha_i(x) = \operatorname{atan2}\left(-\dfrac{\partial \phi_i(x)}{\partial x_1}, \dfrac{\partial \phi_i(x)}{\partial x_2}\right), \quad \text{(Equation 7)}$$

atan 2($a_1$, $a_2$) is the arctangent function of the two arguments $a_1$ and $a_2$ that returns the appropriate angle α such that $\sin \alpha = a_1\sqrt{a_1^2 + a_2^2}$ and $\cos \alpha = a_2\sqrt{a_1^2 + a_2^2}$.

Figure 4:
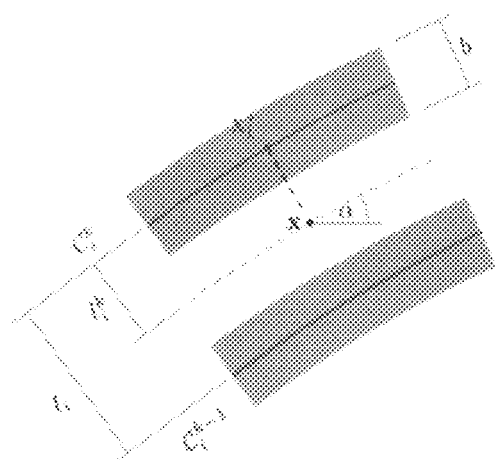
FIG. 4 is an illustration showing how toolpath orientation is defined along with a distance to two adjacent toolpaths.

As discussed in Section 2 below, overlap and sagging constraints are functions of the distance between the toolpaths. To evaluate the distance between adjacent toolpaths $C_i^k$ and $C_i^{k-1}$ at the point x in each layer $\Omega_i$ (as indicated in FIG. 4), we use an approximation. The closest point $x^*$ on the path $C_i^k$ to x solves the minimization problem, $$\operatorname*{minimize}_{y} |y - x|^2 \quad \text{(Equation 8a)}$$

subject to $\phi_i(x) = kb$.

The solution to the above satisfies the Karush-Kuhn-Tucker (KKT) optimal conditions, $$2(x_k^* - x) + \lambda^* \nabla \phi_i(x_k^*) = 0 \quad \text{(Equation 9)}$$

$$\phi_i(x_k^*) - kb = 0 \quad \text{(Equation 10)}$$

where λ is the Lagrange multiplier. However, we instead define $x_k^* = x + \Delta x_k$ and assume $\Delta x_k$ and $\lambda^* \nabla^2 \phi_i(x) \Delta x_k^T$ are small. Whence the first order Taylor series expansions give:

$$\phi_i(x_k^*) \approx \phi_i(x) + \nabla \phi_i(x) \cdot \Delta x_k, \quad \text{(Equation 11)}$$

$$\nabla \Delta_i(x_k^*) \approx \nabla \phi_i(x) + \nabla^2 \phi_i(x) \cdot \Delta x_k^T \quad \text{(Equation 12)}$$

which when combined with Equations (9) and (10), gives $$\Delta x_k = \dfrac{kb - \phi_i(x)}{|\nabla \phi_i(x)|^2} \nabla \phi_i(x) \quad \text{(Equation 13)}$$

The closest point on the toolpath $C_i^{k-1}$ to x is similarly approximated as $x_{k-1}^* = x + \Delta x_{k-1}$ where $$\Delta x_{k-1} \approx -\dfrac{(k-1)b - \phi_i(x)}{|\nabla \phi_i(x)|^2} \nabla \phi_i(x). \quad \text{(Equation 14)}$$

Finally, the distance between two toolpaths $C_i^k$ and $C_i^{k-1}$ at x, is approximated as:

$$l_i = |\Delta x_k + \Delta x_{k-1}| \approx \dfrac{b}{|\nabla \phi_i|}. \quad \text{(Equation 15)}$$

Thus, the spacing between toolpaths depends on the gradient of the level-set function. We use the spacing between toolpaths and the toolpath orientation angle in the following sections to define the DIW constraints and the material model.

Section 2. DIW Constraints

In this section the DIW constraints are described. As mentioned in the previous section, spacing between toolpaths is related to the gradient of the level-set function. Even spacing between toolpaths indicates the level-set function has a uniform gradient. Closely spaced toolpaths are indicative of large $|\nabla \phi_i|$ values, whereas widely spaced toolpaths are indicative of small values.

Figure 5:
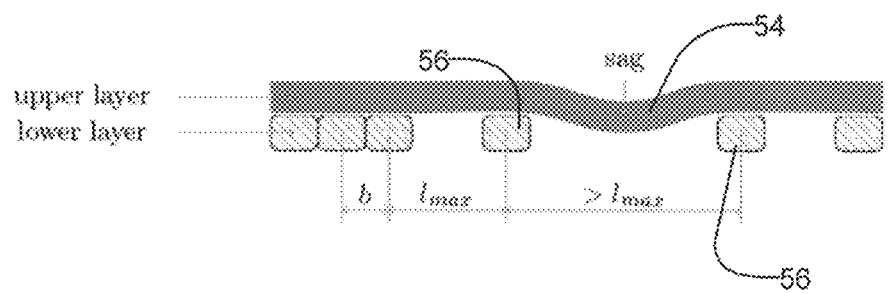
FIG. 5 is a cross sectional side view of two adjacent layers of material illustrating the minimum and maximum distance between adjacent toolpaths, and further illustrating how material sagging may occur if the maximum toolpath spacing is exceeded.

FIG. 5 illustrates the cross section of the printed paths of a lower layer of a part. Notice that the minimum allowed distance between toolpaths is b. So, toolpaths do not overlap if $l_i \geq b$. Using Equation (15), we express this "no overlap" constraint by:

$$|\nabla \phi_i(x)| \leq 1. \quad \text{(Equation 16)}$$

This constraint holds for every point x in each layer $\Omega_i$, which means that it is a local constraint.

To consolidate local constraints into a single global constraint, Amstutz et al. *Topological Derivative-Based Topology Optimization of Structures Subject to Drucker-Prager Stress Constraints*, Computer Methods in Applied Mechanics and Engineering, 233:123-136, 2012, use a penalty function. Similar to Amstutz et al., we express one overlap global constraint for each layer $\Omega_i$ as:

$$G_i^\alpha = \int_P R(|\nabla \phi_i(x)|^2 - 1) d\alpha \leq 0, \quad \text{(Equation 17)}$$

where R is a ramp function such that $$R(\theta) = \begin{cases} 0, & \text{if } \theta \leq 0 \\ m\theta, & \text{if } \theta > 0, \end{cases} \quad \text{(Equation 18)}$$

where m>0. It is easily seen that if for some region in the domain $|\nabla \Delta_i|>1$, then the constraint is violated, i.e., $G_i^\alpha>0$. We thus have one overlap constraint per layer.

Figure 6:
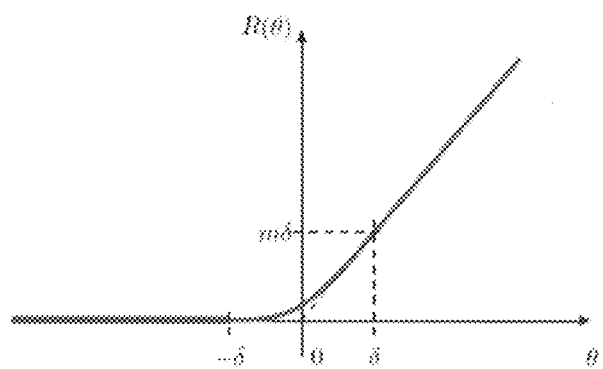
FIG. 6 is a graph showing a continuous differentiable ramp function used to consolidate local constraints into a single global constraint.

To use numerical methods to solve the optimization problem, we redefine R as the continuous differentiable piecewise function:

$$R(\theta) = \begin{cases} 0, & \text{if } \theta \leq -\delta \\ m\left(\dfrac{\theta^3}{6\delta^2} + \dfrac{\theta^2}{2\delta} + \dfrac{\theta}{2} + \dfrac{\delta}{6}\right), & \text{if } -\delta < \theta \leq 0 \\ m\left(-\dfrac{\theta^3}{6\delta^2} + \dfrac{\theta^2}{2\delta} + \dfrac{\theta}{2} + \dfrac{\delta}{6}\right), & \text{if } 0 < \theta \leq \delta \\ m\theta, & \text{if } \delta < \theta \end{cases} \quad \text{(Equation 19)}$$

where a smaller δ corresponds to a sharper transition at θ=0, (see FIG. 6). The coefficients m and δ should be chosen carefully to facilitate the numerical optimization.

To enforce evenly spaced toolpaths, researchers have extrapolated the zero level-set using the "Fast Marching Method" (see, e.g., Sethian. *Level Set Methods and Fast Marching Methods: Evolving Interfaces in Computational Geometry, Fluid Mechanic, Computer Vision*, and Materials Science, Vol. 3, Cambridge University Press, 1999. As mentioned previously, this extrapolation does not always guarantee continuous paths. If required, a "no gap" constraint can be added to the problem formulation if we enforce the separation of the toolpaths to be constant (i.e., $l=b$ or $|\nabla \phi|=1$). However, the toolpaths do not need to be evenly spaced with the methodology described herein when implemented in a DIW process. That said, it has been noted that somewhat evenly spaced toolpaths naturally appear in the designs which have been created and tested because the optimizer subsystem 24 wants a stiffer, fully dense, structure.

Figure 7:
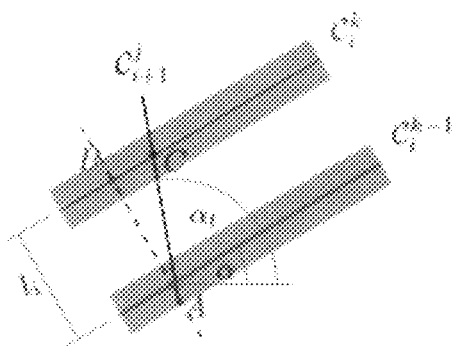
FIG. 7 is a diagram illustrating how support points of an upper toolpath are defined to prevent material sagging.

In DIW typical processes, the extruded material deposited by the nozzle 12 may sag if it does not have proper support. This is shown by sagging material portion 54 in FIG. 5, which does not have sufficient material support because of the excessive spacing of toolpaths 56 of the immediately adjacent lower material layer. This problem with material sagging can be especially challenging if the printed structure cures slowly. To prevent sag, we consider the two adjacent toolpaths $C_i^k$ and $C_i^{k-1}$ on layer $\Omega_i$ illustrated in FIG. 7. The line AC in FIG. 7 represents a layer $\Omega_{i+1}$ toolpath $C_{i+1}^j$ immediately above $C_i^k$ and $C_i^{k-1}$. As seen in FIG. 7, support points A and C on layer $\Omega_i$ support $C_{i+1}^j$ on layer $\Omega_{i+1}$. The distance between these support points at $x \in \Omega_i$ is approximated by $$l_{AC} = \frac{l_i}{|\sin(\alpha_{i+1}^j - \alpha_i^{k-1})|} \quad \text{(Equation 20)}$$

where $l_i$ is the approximated distance between toolpaths $C_i^k$ and $C_i^{k-1}$, and $\alpha_{i+1}^j$ is the orientation angle of toolpath $C_{i+1}^j$. Sag occurs if $l_{AC}$ is larger than the maximum allowed distance $l_{max}$, and thus at each $x \in \Omega_i$ we require $l_{AC} \leq l_{max}$. These local no sag constraints are agglomerated for each layer $\Omega_i$ as:

$$G_i^b = \int_{P_i} R\left(1 - \frac{l_{max}^2}{b^2}|\nabla \phi_i|^2 \sin^2(\alpha_{i+1} - \alpha_i)\right) da \leq 0, \quad \text{(Equation 21)}$$

where R is the smooth ramp function of Equation (19), and we use Equations (15) and (20) and (7) to express $\alpha_i^{k-1}$ and $\alpha_{i+1}^j$ in terms of $\phi_i$ and $\phi_{i+1}$.

The $G_i^b$ no sag constraints, forces toolpaths to be close between each other, and to form a cross-pattern with respect of the toolpaths of their adjacent layers. And because $0 \leq \sin^2(\alpha_{i+1}^j - \alpha_i^{k-1}) \leq 1$, the slope of the level-set function is bounded from below as $|\phi(x)| \geq b/l_{max}$. An important consequence of this constraint is that toolpaths cannot form internal loops, which guarantees continuous toolpaths across the domain. Using a similar argument with Equations (15), (16) and (20), we determine that the angle difference between the toolpaths of the adjacent layers is bounded by:

$$|\alpha_{i+1} - \alpha_i| \geq \sin^{-1}\left(\frac{b}{l_{max}}\right) > 0, \quad \text{(Equation 22)}$$

i.e., toolpaths on an upper layer should not be parallel to the toolpaths of its supporting layer. This constraint further enforces a well supported cross-pattern of toolpaths between adjacent layers.

Figure 8:
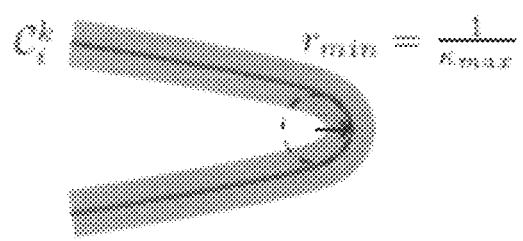
FIG. 8 shows a plane view representation of a toolpath curvature and a minimum allowable radius of curvature.

Manufacturable toolpaths have a minimum allowable radius of curvature $r_{min}$ (see FIG. 8). Additionally, in regions with small radius of curvature, the fibers of the deposited material do not align with the toolpath. To satisfy this minimum radius of curvature constraint, we compute the path curvature $\kappa_i$ via the divergence of the curve $C_i^k$ normal vector, i.e., $\kappa_i = \nabla \cdot n_i$, where $n_i = \nabla \phi / |\nabla \phi_i|$. For our level-set representation this reduces to:

$$\kappa_i = \nabla \cdot \frac{\nabla \phi_i}{|\nabla \phi_i|} = \frac{\dfrac{\partial^2 \phi_i}{\partial x_1^2}\left(\dfrac{\partial \phi_i}{\partial x_2}\right)^2 - 2\dfrac{\partial^2 \phi_i}{\partial x_1 \partial x_2}\left(\dfrac{\partial \phi_i}{\partial x_1}\right)\left(\dfrac{\partial \phi_i}{\partial x_2}\right) + \dfrac{\partial^2 \phi_i}{\partial x_2^2}\left(\dfrac{\partial \phi_i}{\partial x_1}\right)^2}{|\nabla \phi_i|^3} \quad \text{(Equation 23)}$$

where the second derivatives are computed by differentiating Equation (5). As seen above, the curvature is continuous since we require $\in C^2$, and it is bounded due to the constraints on $|\nabla \phi_i|$.

The DIW printing capabilities of the system 10 require $|\kappa_i^{k-1}| < r_{min}$. Thus, in each layer $\Omega_i$, the global curvature constraint:

$$G_i^c = \int\!\!\int_{P_i} R(r_{min}^2 \kappa_i^2 - 1) da \leq 0, \quad \text{(Equation 24)}$$

is enforced. This constraint also proves useful to control numerical instabilities due to rapid changes in orientation angle of the fibers which often manifests itself in finite element base parameterizations. See, Setoodeh et al. *Design of Variable-Stiffness Composite Layers Using Cellular Automata*, Computer Methods in Applied Mechanics and Engineering, 195(9):836-851, 2006.

Section 3. Material Modeling

Figure 9:
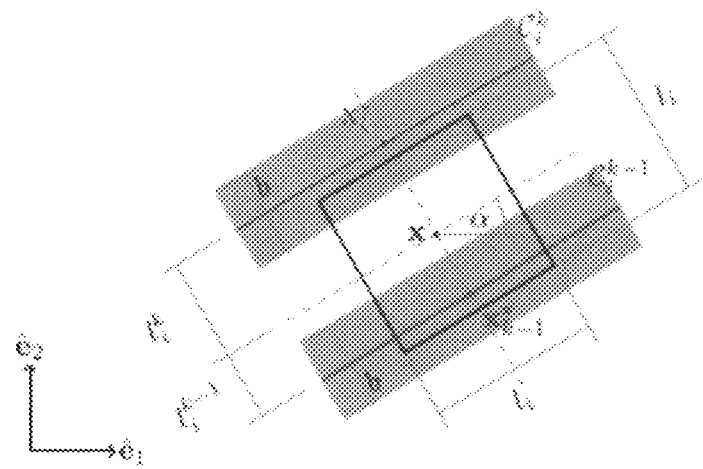
FIG. 9 shows a rectangular parallelepiped as a Representative Volume Element (RVE) for modeling purposes.

The structure is modeled as a variable stiffness composite laminate in which the material volume fraction and stiffness are homogenized using our level-set function. To approximate the volume fraction of material at $x \in \Omega_i$, we introduce a rectangular parallelepiped as a Representative Volume Element (RVE) of size $l_i \times l_i \times h$ oriented with the angle α with respect to the $\hat{e}_1$ axis, cf. FIG. 9. In this RVE, we assume the toolpaths are straight and parallel. Thus, the minimum radius of curvature constraint helps to maintain the integrity of our RVE formulation as we minimally require $r_{min} > l_{max}$. As seen in FIG. 9, $x_k^* \in C_i^k$ and $x_{k-1}^* \in C_i^{k-1}$ are the closest toolpath points to x, and $l_k$ and $l_{k-1}$ are their respective distances from x. The lateral RVE dimension $l_i = l_k + l_{k-1}$ is the distance between the toolpaths. Using Equation (15), we compute the volume fraction of material enclosed in the RVE as:

$$v_i \approx \frac{b l_i h}{l_i^2 h} = |\nabla \phi_i|. \quad \text{(Equation 25)}$$

We compute the total volume fraction of the design as:

$$v_T = \frac{1}{V_\Omega} \sum_{i=1}^{n_l} \int_{\Omega_i} v_i(x) dv, \quad \text{(Equation 26)}$$

where $V_\Omega$ is the total volume of the domain $\Omega$.

We homogenize the stiffness in the layer $\Omega_i$ at each point x using the volume fraction, v, and the fiber orientation $\alpha$, i.e., $$\mathbb{R}_i^*(x) = v_i(x) \mathbb{R}(\alpha_i(x)), \quad \text{(Equation 27)}$$

$$\text{where } \mathbb{R}(\alpha) = (R_z(\alpha) \mathbb{C} R_z(\alpha)) \mathbb{R}_0 (R_z(\alpha) \mathbb{C} R_z(\alpha))^T, \quad \text{(Equation 28)}$$

$\mathbb{R}_0$ is the stiffness of the full volume fraction material with fibers parallel to $\hat{e}_1$ and $R_z$ is an $\alpha$ rotation tensor about the $\hat{e}_3$ axis. The material properties for each layer $\Omega_i$ vary in the plane $P_i$; they are uniform in the $\hat{e}_3$ direction.

The sensitivity of the stiffness is given by:

$$\frac{\partial \mathbb{C}_i^*}{\partial d_i} = \frac{\partial v_i}{\partial d_i} \mathbb{C} + v_i \frac{\partial \mathbb{C}}{\partial d_i} \frac{\partial \alpha_i}{\partial d_i}, \quad \text{(Equation 29)}$$

where the components of $\partial \mathbb{R}/\partial \alpha_i$ are obtained by differentiating Equation 28. The derivative of the orientation angle with respect to the design variables follows from Equations (5) and (7), i.e., $$\frac{\partial \alpha_i}{\partial d_i} = \frac{\frac{\partial \phi_i}{\partial x_1} \hat{B}_2 - \frac{\partial \phi_i}{\partial x_2} \hat{B}_1}{|\nabla \phi_i|^2} \quad \text{(Equation 30)}$$

The derivative of the volume fraction follows from Equations (5) and (25), i.e., $$\frac{\partial v_i}{\partial d_i} = \frac{\frac{\partial \phi_i}{\partial x_1} \hat{B}_1 + \frac{\partial \phi_i}{\partial x_2} \hat{B}_2}{|\nabla \phi_i|}. \quad \text{(Equation 31)}$$

Section 4. Elastostatics

Figure 10:
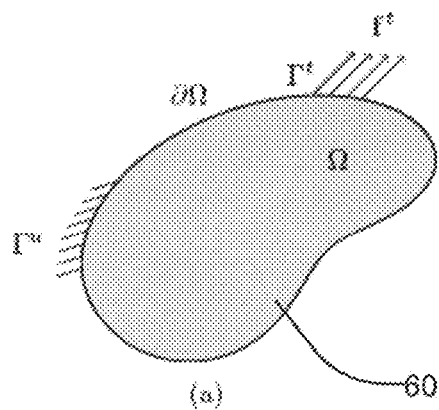
FIG. 10 is a diagram illustrates an elastic problem for a linear elastic body.

The governing equations for the displacement u of our linear elastic body 60, as shown in FIG. 10, are:

$$\text{div } \sigma + f^b = 0 \text{ in } \Omega, \quad \text{(Equation 32)}$$

$\sigma = \mathbb{C}_i^* \in$ in $\Omega_i$, for i=1, 2, ..., $n_l$
$\in = (\nabla u + \nabla u^T)/2$ in $\Omega$,
u=0 on $\Gamma^u$,
$\sigma n = f^t$ on $\Gamma^t$,
$\sigma n = 0$ on $\Gamma^0$, where $f^b$ is the body force, $\sigma$ is the stress tensor, $\in$ is the strain tensor, n is the normal vector to the domain boundary $\partial \Omega$, the displacement is fixed on the boundary $\Gamma^u$, the traction $f^t$ is prescribed on the boundary $\Gamma^t$, and $\Gamma^0 = \partial \Omega \setminus (\Gamma^u \cup \Gamma^t)$.

In this study, the cost function is the usual compliance, i.e., $$c = \int_\Omega u \cdot f^b dv + \int_{\Gamma^t} u \cdot f da, \quad \text{(Equation 33)}$$

Using the adjoint method, the sensitivities are described in Bensøe et al. *Topology Optimization by Distribution of Isotropic Material*, Springer, 2004 and Tortorelli et al. *Design Sensitivity Analysis: Overview and Review*, Inverse Problems in Engineering, 1(1): 71-105, 1994, and may be represented as:

$$\frac{Dc}{Dd_i} = -\int_{\Omega_i} \epsilon^T \frac{\partial \mathbb{C}_i^*}{\partial d_i} \epsilon dv. \quad \text{(Equation 34)}$$

Note that we compute this integral for each layer $\Omega_i$ to evaluate the sensitivities with respect to its layer $\Omega_i$ design variable vector di.

Section 5. Optimization Problem

As alluded to above, the goal is to design a fiber reinforced composite (FRC) structure that minimizes compliance and satisfies manufacturing constraints. To these ends, we solve the optimization problem:

$$\begin{aligned} &\underset{d}{\text{minimize}} \ c &&\text{(Equation 35)} \\ &\text{subject to} \quad v_T \leq v_{max}, \\ &\qquad G_i^a \leq 0, \quad i = 1, 2, \ldots, n_l \\ &\qquad G_i^b \leq 0, \quad i = 1, 2, \ldots, n_l - 1 \\ &\qquad G_i^c \leq 0, \quad i = 1, 2, \ldots, n_l \end{aligned}$$

where $v_{max}$ is the maximum allowable volume fraction.

The present disclosure may use nonlinear programming software, in one example the IPOPT (Interior Point Optimizer) software library, to solve this optimization problem. Exact sensitivities may be provided to the IPOPT software library to solve the problem accurately and efficiently. In the previous section, we described how to evaluate sensitivities of the compliance cost function. The sensitivity computation of the constraints is straightforward as they are explicit functions of d.

It is well known that nonlinear programming optimizers usually converge to local minimizers, making the initial design very important. We start from a feasible design in which each layer is made of parallel-straight toolpaths with volume fraction $v = v_{max}$. To do this, we define the layer vectors $a_i = v_{max} [-\sin(\alpha_1), \cos(\alpha_1), 0]^T$ and $\phi_i = a_i \cdot x$ so that $\nabla \phi_i = a_i$ is uniform and $|\nabla \phi|_i = |a_i| = v_{max}$. We then solve the optimization problem:

$$\underset{\alpha_1,\alpha_2,\ldots,\alpha_{n_l}}{\text{minimize}}\ c \qquad \text{(Equation 36)}$$

$$\text{subject to}\quad G_i^0 \leq 0,\ i=1,2,\ldots,n_l-1$$

where $$G_i^0 = 1 - \frac{l_{max}^2}{b^2} v_{max}^2 \sin^2(\alpha_{i+1}-\alpha_i) \leq 0. \qquad \text{(Equation 37)}$$

the is the no sag constraint, (see Equation 21). The solution of Equation (36) i.e., optimal angles $\alpha_i$, is used to define the initial design variables $d_i$ such that $(d_i)_j = \phi_i(x_j) = a_i \cdot x_j$ where $x_j$ are the control point coordinates for layer $\Omega_i$.

Section 6. G-Code Generation

Figure 11A:
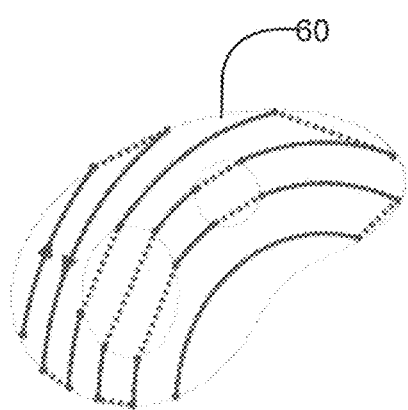
FIGS. 11A and 11B show prior art, traditional zigzag and one-way methods to connect contours of the toolpaths to form a continuous toolpath.
Figure 11B:
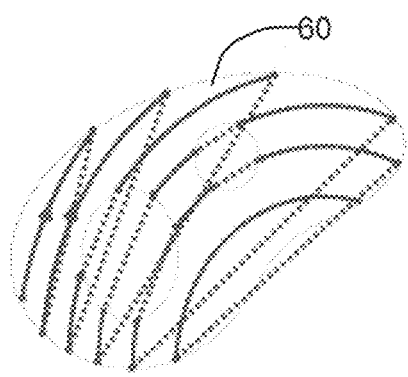

Since $|\nabla\phi|>0$, we are assured the level-set contours on each layer $\Omega_i$ are continuous and contain no loops (cf. Section 2). However, these toolpaths start and finish at a boundary, and they still need to be linked to form a continuous toolpath to generate the layer $\Omega_i$ G-code. Ideally, the shortest toolpath possible is most desirable as this helps to minimize production time when printing each layer of the structure. Traditional zigzag (see FIG. 11A) and one-way (see FIG. 11B) methods to connect the contours generally do not obtain the shortest continuous toolpath, especially if there are holes which need to be created in the structure. To address this path generation problem, we formulate and solve a TSP. Given a finite number of cities and the cost of travel between each pair of cities, the solution of the TSP finds the cheapest way of visiting each city once and returning to the starting city. To formulate the linking sequence of the toolpaths as a TSP, we must define the cities and the cost of travel between them.

Figure 12:
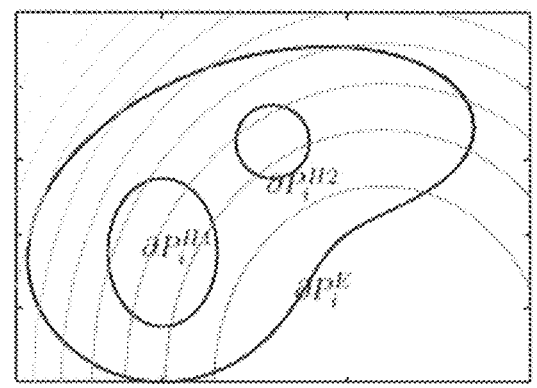
FIG. 12 is a diagram showing a plurality of toolpaths and how the present disclosure may define toolpaths using contours of a level set function in a rectangular domain, and the domain boundaries, and where the domain includes holes.

Before we formulate our TSP, recall that we define the level-set functions over a rectangular domain that encompasses the layers $\Omega_i$, which may include holes (see FIG. 12). We then use Equation (1), to generate a trajectory for each layer toolpath, i.e., contour line $C_i^k$. The first and last point of each trajectory belongs to the boundary $\partial P_i$, which may be the external boundary $\partial P_i^E$, or a hole boundary $\partial P_i^{H1}$, $\partial P_i^{H2}, \ldots, \partial P_i^{Hnh}$, where $n_h$ is the number of holes, cf. FIG. 12.

The goal is to connect all of the $n_t$ layer $\Omega_i$ toolpaths $C_i^1$, $C_i^2, \ldots, C_i^{nt}$, into one contiguous path which is as short as possible. To do this, we formulate a TSP problem in which the first and last point of each toolpath $C_i^k$ are the cities (k) and ($n_t+k$) respectively. We formulate a symmetric TSP where the cost of travel between the cities (k) and (j) is their distance $c_{k,j}^0 = C_{j,k} = d(x_k, x_j)$. Additionally, we define a halfway city ($2n_t+k$) located in between the first (k) and last ($n_t+k$) points of each toolpath $C_i^k$. The exact location of the halfway city is arbitrary, however to enforce that the toolpath follows $C_i^k$ we define the distances such that $c_{2nt+k,j} = c_{2nt+k,nt+j} = C_{2n\ t+k,\ 2nt} = Dj$, where:

$$D_k^j = \begin{cases} 0, & \text{if } j=k \\ \infty, & \text{if } j \neq k. \end{cases} \qquad \text{(Equation 38)}$$

These distance definitions ensure that we respectively visit the cities along each toolpath $C_i^k$ in the order (k), ($2n_t+k$), ($n_t+k$) or vice versa ($n_t+k$), ($2n_t+k$), (k).

To avoid connecting hole boundary cities to external boundary cities, we impose $c_{j,k}=\infty$ if $x_j \in \partial P_i^{Hr}$, and $x_k \in \partial P_i^E$. Similarly to avoid connecting cities on different hole boundaries, we define $c_{j,k}=\infty$ if $x_j \in \partial P_i^{Hr}$, $x_k \in \partial P_i^{Hs}$ and $r \neq s$.

Figure 13:
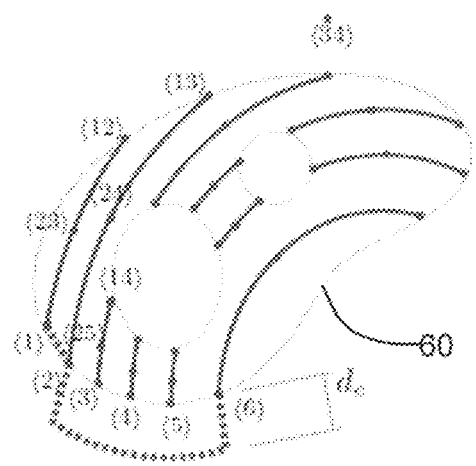
FIG. 13 shows a diagram of example toolpaths and their respective cities identified as points along each toolpath.

For distances between cities, we use the Euclidean distance $d(x_k,x_j)=\sqrt{(x_k-x_j)\cdot(x_k-x_1)}$. However, the distance between non adjacent cities on the external boundary, is defined as:

$$d(x_k,x_j)=\int_{x_k}^{x_j} ds, \qquad \text{(Equation 39)}$$

where $ds=\partial r/\partial t$ is the differential arc of the segment $r(t)$ that connects the cities. To generate a continuous toolpath that does not overlap, the trajectory $r(t)$ follows the boundary $\partial P_i^E$ at the offset distance de (cf. FIG. 13). By avoiding overlaps, the generated toolpaths are manufacturable by the AM processes that continuously deposit material, i.e., do not allow start/stop deposition, at the cost of minimal added material.

Since we do not need to start and finish in the same city, we may add a dummy city ($3n_t+1$) with the following distance definition:

$$c_{3n_t+1,j} = \begin{cases} 0, & \text{if } x_j \in \partial P_i^E \\ \infty, & \text{otherwise} \end{cases} \qquad \text{(Equation 40)}$$

Figure 14:
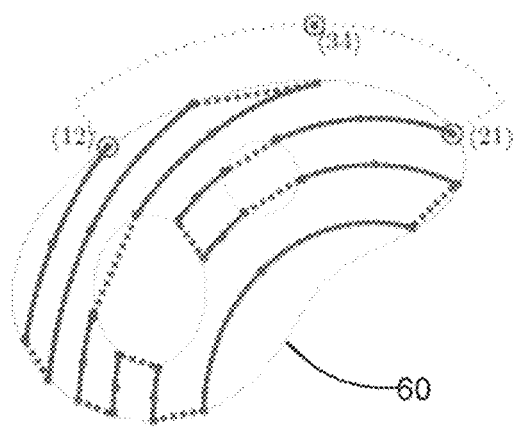
FIG. 14 is a diagram showing an example of a TSP solution to illustrate the shortest linking sequence between example that includes first and last cities, as well as a dummy city.

In this way, two external cities on $\partial P_i^E$ are connected to the dummy city; these external boundary cities are the first and last cities visited (cf. FIG. 14).

Our TSP has $3n_t+1$ cities and the symmetric cost matrix $c_{j,k}$ is computed using the above definitions. The TSP solution is the shortest linking sequence between the toolpaths for every layer $\Omega_i$. To solve the TSPs, we may use, for example, the efficient TSP solver Concorde (see Applegate et al. *The Traveling Salesman Problem: A Computational Study*, Princeton University Press, 2011]. Once the shortest toolpath coordinates are obtained, the G-code generating module 32 may be used to readily write the G-code that the AM system 10 will follow to print the structure.

Section 7. Examples

We apply our method to generate five designs modeling the composite as a transverse isotropic material with longitudinal Young's modulus $E_l$=7.48 GPa, the transverse Young's modulus $E_t$=4.47 GPa, the longitudinal-transverse shear modulus $G_{lt}$=1.7 GPa, the transverse-transverse shear modulus $G_{tt}$=1.63 GPa, the longitudinal-transverse Poisson's ratio $v_{lt}$=0.33, the transverse-transverse Poisson's ratio $v_{tt}$=0.37, and the longitudinal-transverse Poisson's ratio $v_{tl}=v_{lt}E_t/E_l$. The thickness of the layers in this example is $h$=0.3 mm and the thickness of the toolpaths is $b$=0.6 mm. We model the structures using (8-noded) tri-linear prismatic elements in, for example, NIKE3D finite element software. For numerical integration, the NIKE3D software uses 2×2×2 Gauss point rule for each element. The level-set function for each layer is modeled using bi-cubic B-splines with patch size 10 mm×10 mm (cf. Appendix A) unless otherwise stated. For the numerical integration of the constraints, we use 16×16 Gauss quadrature points in each B-surface patch. The parameters of the smooth ramp function R are $\delta$=0.01 and $m$=10. The maximum sag distance is $l_{max}$=1.6 mm and the minimum radius of curvature is $r_{min}$=2 mm which is larger than $l_{max}$. We compute the compliance c0 for a design with horizontal minimally spaced parallel toolpaths, i.e., $\phi_i(x)=x\cdot\hat{e}_2$ for $i=1, 2, \ldots, n_l$. We use this reference compliance $c_0$ to normalize the objective function. IPOPT converges successfully if the norm of the KKT optimality conditions, is smaller than the tolerance $\varepsilon_{tol}=10^{-4}$ (cf. Equation (5) and (6) in [54]), unless otherwise stated.

7.1 Short Cantilever Beam

Figure 15:
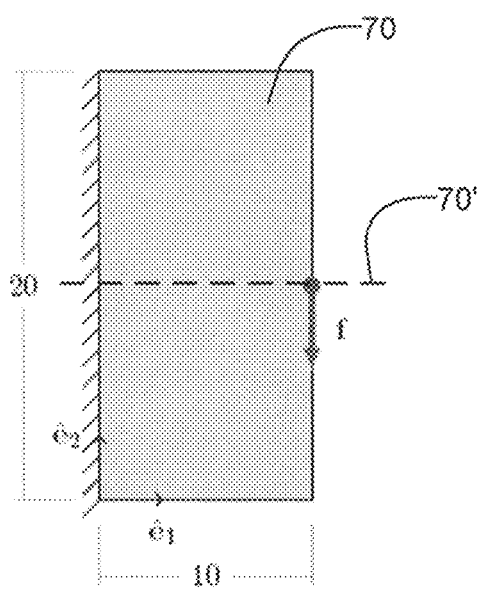
FIG. 15 is simplified drawing of a short cantilever beam used as one example of how the determine optimal toolpaths for each one of a plurality of layers which make up the beam.

Our first example is a 2 layer short cantilever beam 70 with dimensions shown in FIG. 15. The beam 70 is subject to a transverse tip line load $f=-1$ kN/mm $\hat{e}_2$ in the middle of the right edge. The left edge of the beam 70 is fixed $u(x_1=0)=0$. The finite element mesh has 400 elements of size 1 mm×1 mm×0.3 mm. We model the level-set functions with 2×1 B-surface patches per layer, so the optimization problem has $(2+3)(1+3)=20$ design parameters. No volume restriction is imposed, i.e., $v_{max}=1$.

Figure 16B:
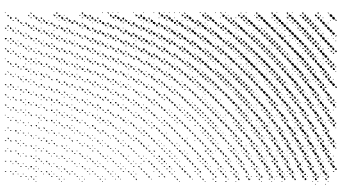
FIGS. 16A and 16B illustrate optimal angles to define the initial level-set functions.
Figure 16A:
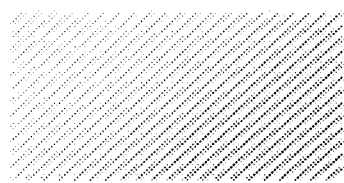

To find the optimal solution for this short cantilever beam 70, we start with the initial angle orientation of ±45° for each layer and solve Equation 36 to find the optimal layer angles ±51.07° with a compliance $c/c_0=0.852$. We use these optimal angles to define the initial level-set functions using the method described in Section 5 (see FIGS. 16A and 16B), in which the different colors of the contours indicates the contour values, and every contour represents a toolpath. Starting from this initial design, we solve Equation 35 to obtain the optimal level-set function contours shown in FIGS. 17A and 17B. As we expect, the toolpaths are relatively parallel and evenly spaced because a fully dense design is stiffer. The compliance for this solution is $c/c_0=0.823$, which is stiffer than the initial design.

Figure 17B:
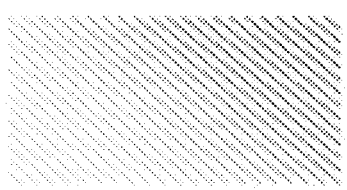
FIGS. 17A and 17B show optimal level-set function contours for the toolpaths that will be used to form the beam of FIG. 15, with $v_{max}=1.0$.
Figure 17A:
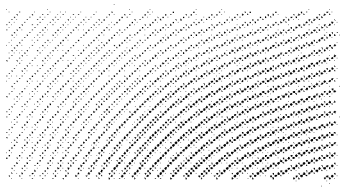
Figure 18A:
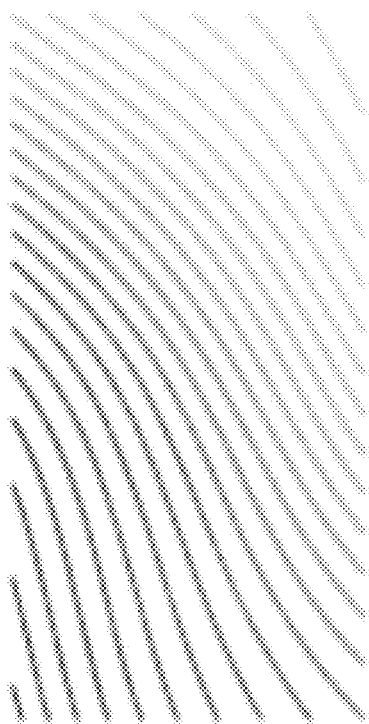
FIGS. 18A and 18B show optimal level-set function contours for the beam of FIG. 15, with $v_{max}=0.8$.
Figure 18B:
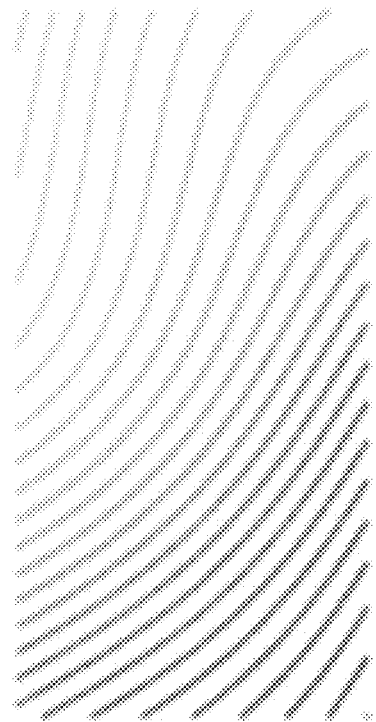

We form a continuous toolpath for every layer by solving the TSP described in Section 6 (see FIGS. 17B and 17D). As expected, the toolpaths are zigzags. We also added an extra connection to link the bottom and top layers. For the bottom layer (see FIG. 17C), the starting point is the blue triangle 72 and the end point is the blue circle 74. For the top layer (see FIG. 17D), the starting point is the red triangle 76 and the end point is the red circle 78. FIG. 17E shows the juxtaposed toolpaths from FIGS. 17C and 17D. Notice that the start point of the top layer (point 76 on FIG. 17D) is above the end point (point 74) of the bottom layer in FIG. 17C. This path forms the G-code that controls the AM printer nozzle 12.

Figure 19A:
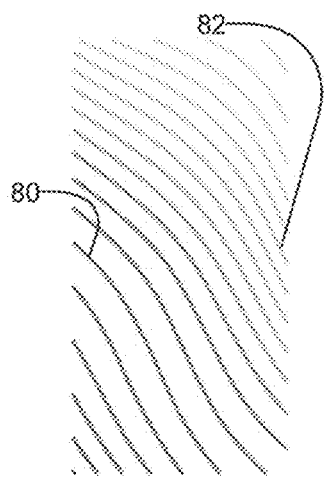
FIGS. 19A and 19B show optimal level-set function contours with $v_{max}=0.6$.
Figure 19B:
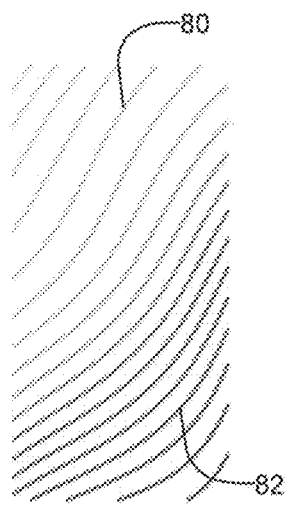
Figure 19C:
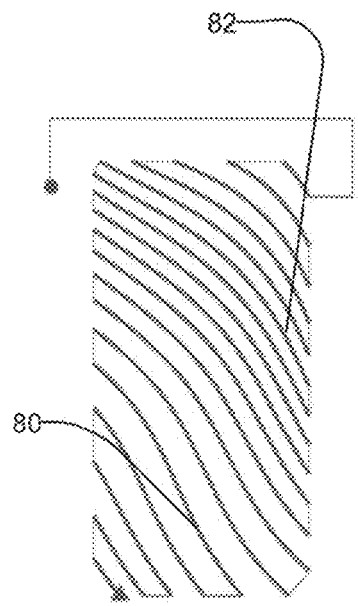
FIGS. 19C and 19D show connected toolpaths with $v_{max}=0.6$.
Figure 19D:
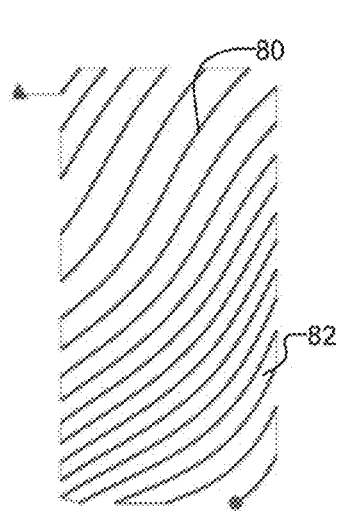
Figure 19E:
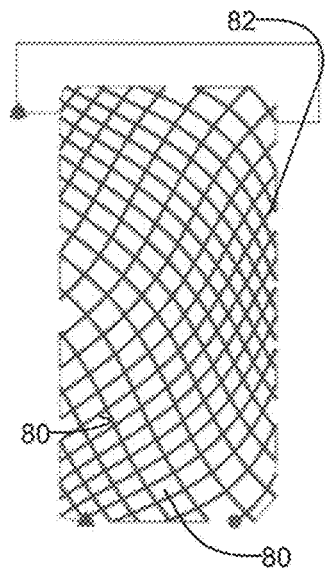
FIG. 19E shows juxtaposed toolpaths for the short cantilever problem with $v_{max}=0.6$.

The optimizer subsystem 24 solves the same problem for different volume fraction constraints. Table 1 of FIG. 19F and FIGS. 18-20 summarize and illustrate our results. As expected, the compliance increases as the volume fraction decreases. If the number of active DIW constraints is larger, the number of design iterations (It.) increases FIG. 19F shows that the $v_{max}=1$ and $v_{max}=0.4$ have a larger number of iterations (86 and 84 respectively) with respect to the other $v_{max}$ values. For $v_{max}=1$, the no overlap constraint is active in the whole design because contours are the closest is possible (compare, for example, FIG. 17). For $v_{max}=0.4$, the no sag constraint is active because the contours are very apart from each other (compare FIG. 20).

This increasing number of DIW constraints, and the increasing number of design iterations (It.), occurs for large maximum volume fraction designs for which the "no overlap" constraint is active and for low maximum volume fraction designs for which the "no sag" constraint is active. The designs have similar patterns but different spacings between toolpaths 80. However, in all cases toolpaths are closer together at the load region 82. At the bottom and top of the left edge in each of FIGS. 19A-19E, the toolpaths 80 tend to be horizontal and closely spaced. At the neutral axis (line 70' in FIG. 15), the toolpaths 80 form a cross structure to carry the shear load. Again as expected, the toolpaths are closer where stress magnitude is higher.

Section 7.2 Long Cantilever Beam

Figure 21:
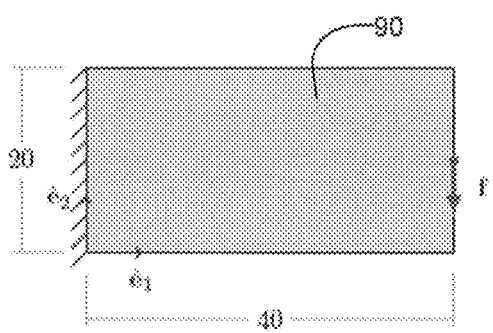
FIG. 21 illustrates a long, four layer cantilever beam as another example for determining optimal toolpaths.
Figure 20A:
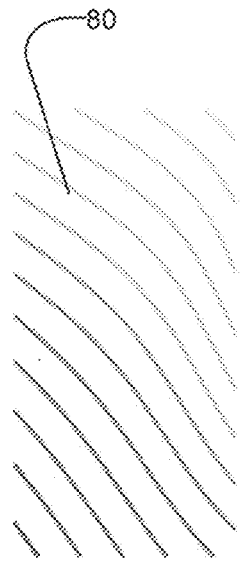
FIGS. 20A and 20B show optimal level-set function contours with $v_{max}=0.4$.
Figure 20B:
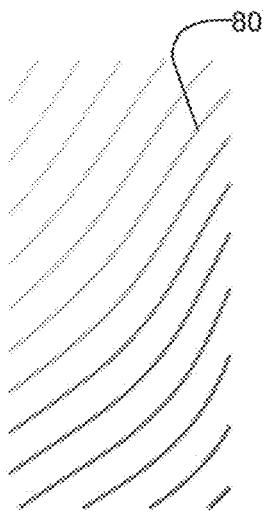
Figure 20C:
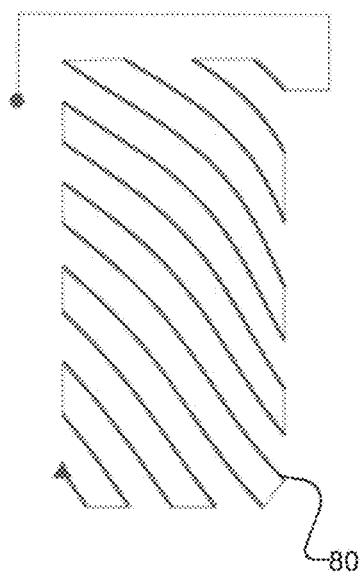
FIGS. 20C and 20D show connected toolpaths with $v_{max}=0.4$.
Figure 20D:
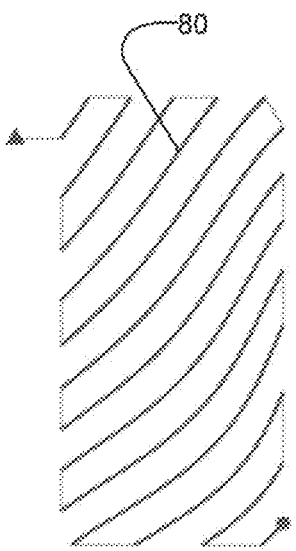
Figure 20E:
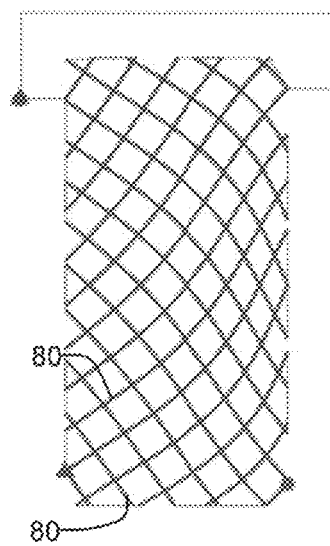
FIG. 20E shows juxtaposed toolpaths for the short cantilever problem with $v_{max}=0.4$.
Figure 22A:
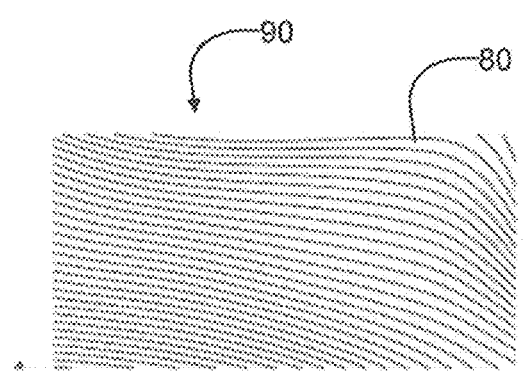
FIGS. 22A through 22D illustrate an optimal continuous toolpath for each of the four layers of the long cantilever beam problem, with stack sequence ABCD.
Figure 22B:
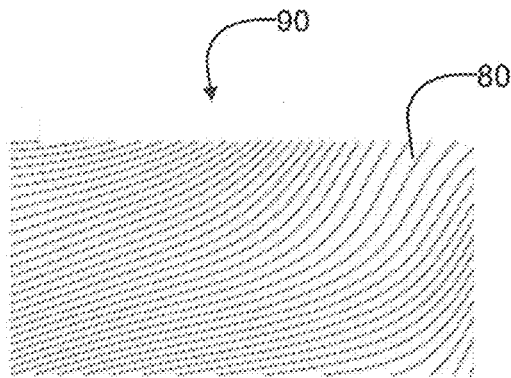
Figure 22C:
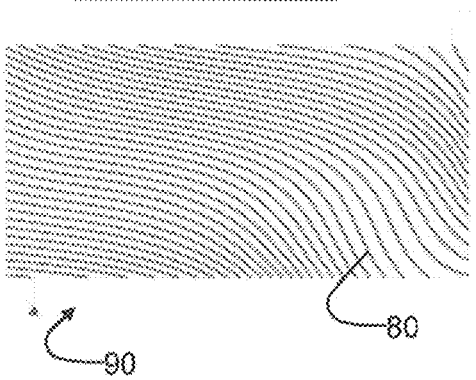
Figure 22D:
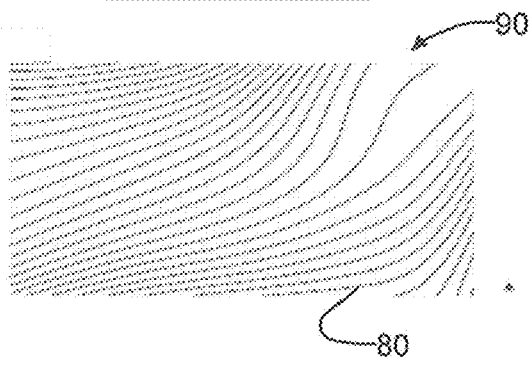

In this example, we solve a 4 layer cantilever beam 90 with dimensions shown in FIG. 21 and subject to the line load is $f=-1$ kN/mm $\hat{e}_2$. The finite element mesh has 3200 elements of size 1 mm×1 mm×0.3 mm.

We find the optimal designs for $v_{max}=0.7$ and 5 different stacking sequences: ABCD, ABCA, ABCB, ABAC, and ABAB, where each capital letter represent an independent layer of the stack. There are 2×4 B-surface patches with 35 design parameters per layer, so the 5 stacking sequences respectively have 140, 105, 105, and 70 design parameters. In Table 2 (FIG. 21A), we denote the compliances and the number of design iterations for each sequence. We solve the problem for two convergence tolerances $\varepsilon_{tol}=10^{-3}$ and $10^{-4}$ Obviously, the optimizer subsystem 24 requires more iterations to converge to a solution for the smaller $\varepsilon_{tol}$.

For the sequence ABCA the optimizer subsystem 24 is not able to find a feasible solution due to the conflict between the "no sag" constraint and the stack pattern. Toolpaths 80 of adjacent layers make a crossed pattern with an angle difference greater than a minimum given by Equation (22). Consequently, the first and fourth layers tend to make a crossed pattern as well, which is not possible since they are both layer A.

Figure 23A:
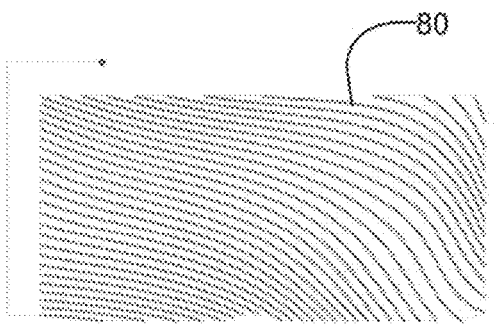
Figure 23B:
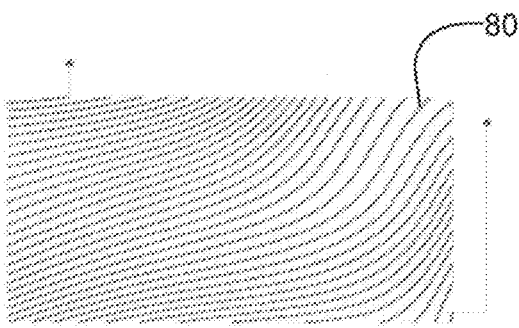
Figure 23C:
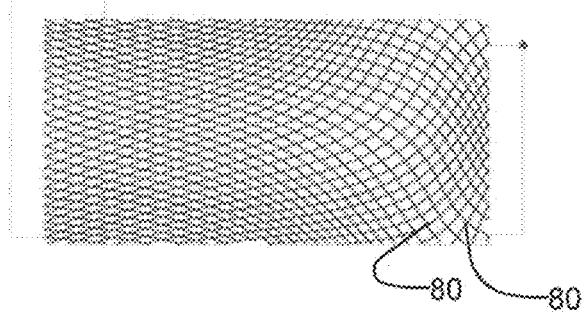
FIG. 23c shows juxtaposed toolpaths of the cantilever beam problem with stack sequence ABAB.

The optimal designs for the different stack sequences have similar patterns as we see in FIGS. 22 and 23. However, notice that the toolpaths 80 in the uppermost layer of ABCD (FIG. 22D) are farther apart compared to the other layers because it does not serve as a support layer, i.e., the no sag constraint is not enforced. Because the layers are independent, the DIW constraints are easier to satisfy resulting in the lowest compliance, i.e., best design. However, the difference of compliance with the other patterns is less than 2 percent.

Section 7.3 MBB Beam

Figure 24:
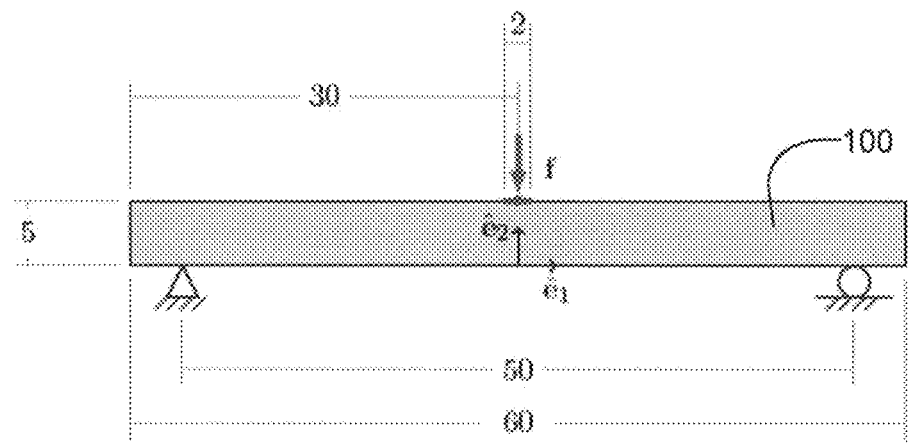
FIG. 24 illustrates another example of a beam, in this example a Messerschmitt-Bölkow-Blohm (MBB) beam, made of 50 layers, for which optimum toolpaths will be found for two independent layers of the beam.
Figure 25A:
FIGS. 25A-25C show juxtaposed toolpaths for multiple layers of the MBB problem with $v_{max}=1$ for FIG. 25A, $v_{max}=0.8$ for FIG. 25B and $v_{max}=0.6$ for FIG. 25C.
Figure 25B:
Figure 25C:
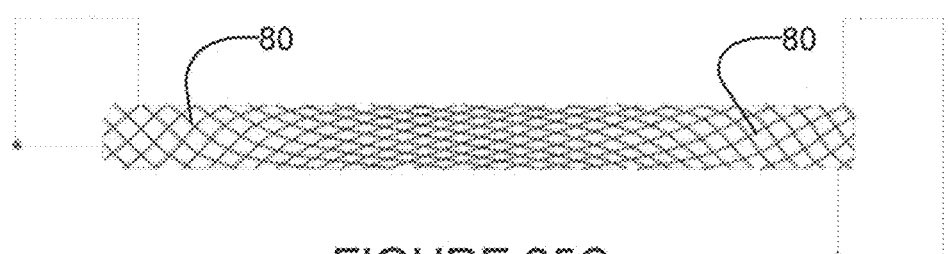

The next example is a Messerschmitt-Bölkow-Blohm (MBB) 100 beam made of 50 layers with dimensions shown in FIG. 24. The beam 100 is subject to a load $f=-10$ N/mm² $\hat{e}_2$ located at the top center. 15000 elements of size 1 mm×1 mm×0.3 mm are used to discretize the domain. We find the solution for two independent layers with stacking sequence ABAB . . . AB. There are 1×6 B-surface patches per layer of size 5 mm×10 mm, so there are 156 design parameters. We solve the problem with the volume fraction constraints of $v_{max}=1$, 0.8 and 0.6. The juxtaposed toolpaths 80 are shown in FIG. 25. If these optimal designs are printed and tested, then even lower deflection would be expected where the load is applied in comparison with other designs (e.g., ±45° designs) with the same volume fraction. Also, designs with larger volume fraction will deflect the least.

Section 7.4 Two-Hole Plate

Figure 26:
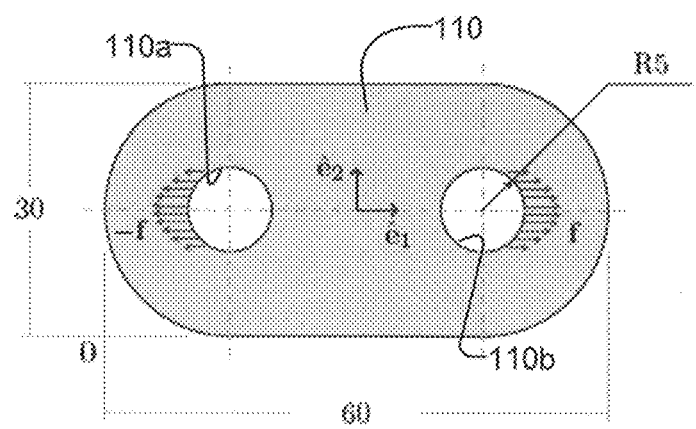
FIG. 26 illustrates a plane view of a 12 layer two-hole plate as another example of a problem for which optimal toolpaths may be obtained, with stacking sequence ABAB.
Figure 27A:
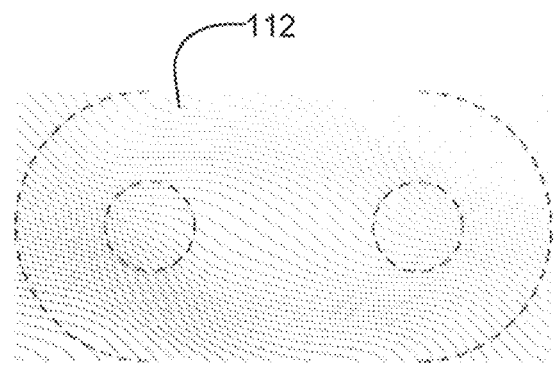
FIGS. 27A and 27B show contours of a level-set function for layer A over rectangular (FIG. 27A) and two-hole plate (FIG. 27B) domains.
Figure 27B:
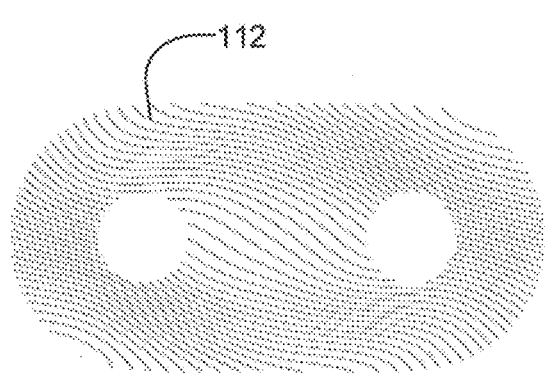
Figure 27C:
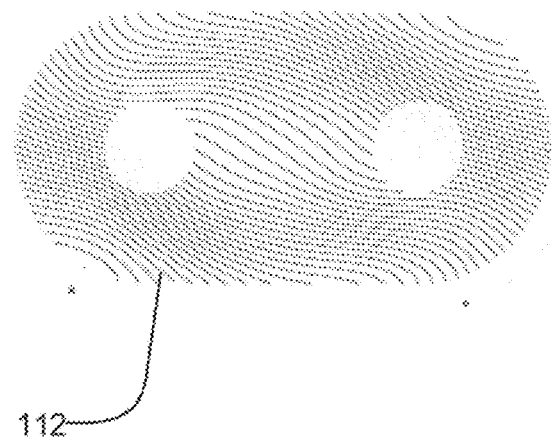
FIG. 27C illustrates the length of the continuous toolpath of the layer A generated by using the zigzag linking method.
Figure 27D:
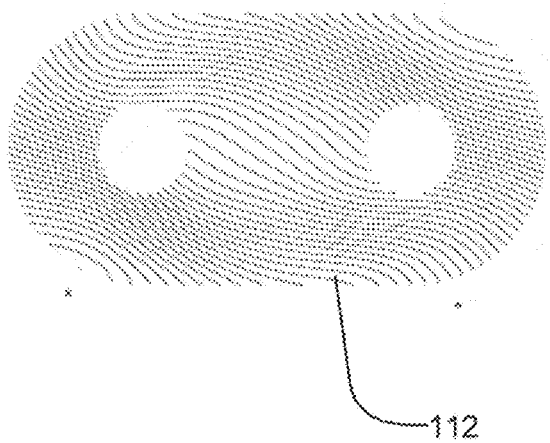
FIG. 27D illustrates the TSP continuous toolpath solution of the layer A of the two-hole plate problem.
Figure 28A:
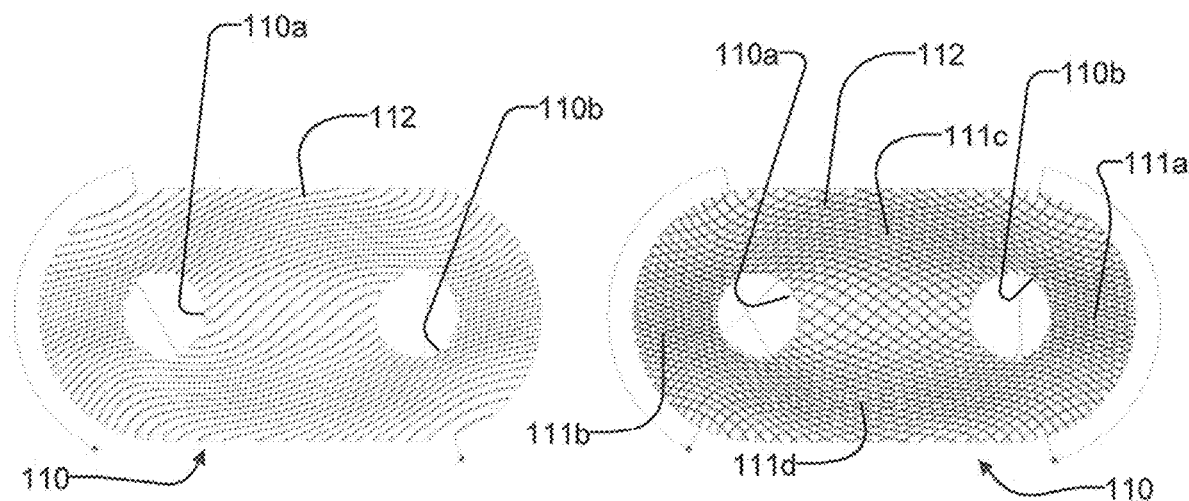
FIG. 28A shows a TSP continuous toolpath for layer B of the two-hole plate problem.

The next example problem solved is the two-hole plate 110 problem illustrated in FIG. 26. The two-hole plate 110 has a left hole 110a and a right hole 110b. In the right hole 110b, we apply a traction $f=(100-4(15-x_2)^2)$kN/mm²$\hat{e}_2$. While, at the left hole 110a we apply $-f$. The plate 110 in this example is made of 12 layers with an ABAB . . . AB stacking sequence for a total of 108 design parameters. The finite element mesh contains 17424 elements. The volume fraction limit is $v_{max}=0.7$. In FIGS. 27A and 27B, we show the contours 112 of the level-set function for Layer A over the rectangular and the two-hole plate domains. For the layer A, the total length of the continuous toolpath generated by the TSP is 1821 mm (cf. FIG. 27D), which is 8% shorter than the one obtained by the zigzag method that is 1968 mm (compare FIG. 27C). If the parts have larger holes, the TSP will have more significant improvement in the total distance versus the zigzag method because the toolpath will avoid the large connections that cross the holes 110a and 110b. Also, in the cases where the DIW process continuously deposits material, the TSP solution does not fill the holes 110a and 110b, which conserves material and post subtractive manufacturing operations. By "post subtractive" manufacturing, it will be understood that if material is deposited continuously (no stop deposition in the holes or boundary), then one would need to perform a post subtractive operation, for example drilling the holes. We show the continuous toolpath 112 for layer B in FIG. 28A. Finally, FIG. 28B shows the continuous juxtaposed toolpaths for both layers. In FIG. 28B, a load is acting at region 111a and a force is acting at region 111b. It can be seen that regions 111c and 111d form more dense material regions. Paths are closer in the regions where the forces act (i.e., regions 111a and 111b). At regions 111c and 111d, i.e., the bottom and top of the region between the holes 110a and 110b, the toolpaths 112 tend to be horizontal and closely spaced in order to better carry the tensile load.

Section 7.5 Five-Hole Plate

Figure 29:
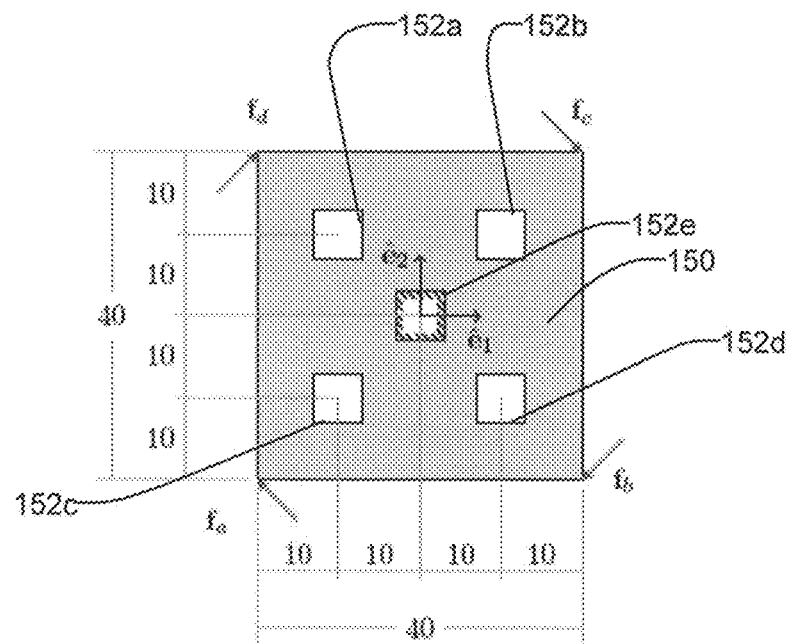
FIG. 29 illustrates another example in which the present disclosure may be used to solve the TSP for a 12 layer five-hole plate problem with forces and dimensions as shown in the Figure, with stacking pattern ABAB.
Figure 30A:
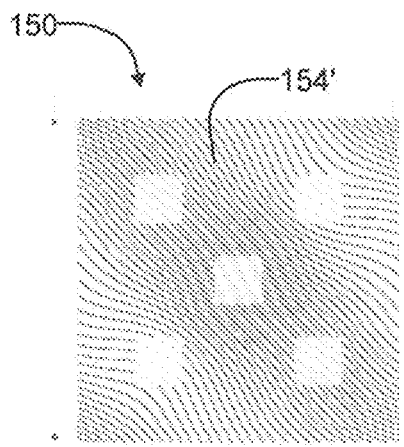
FIG. 30A illustrates the continuous toolpath for the layer A of the five-hole plate problem which is generated by the zigzag method.
Figure 30B:
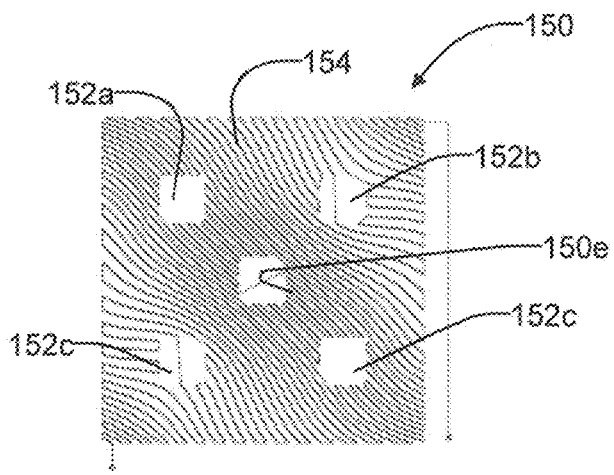
FIG. 30B illustrates a shortest continuous toolpath generated by solving the TSP for the layer A of the five hole-plate problem.
Figure 31A:
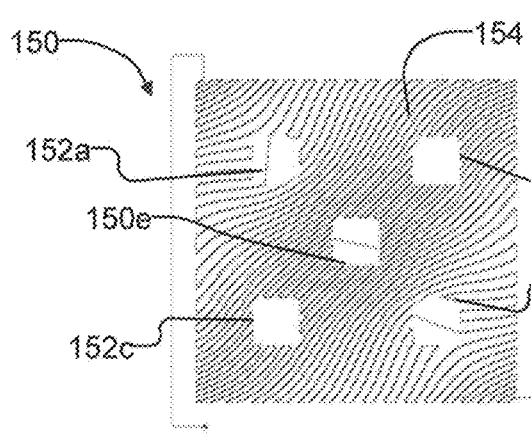
FIG. 31A shows the TSP continuous toolpath obtained for the layer B.
Figure 31B:
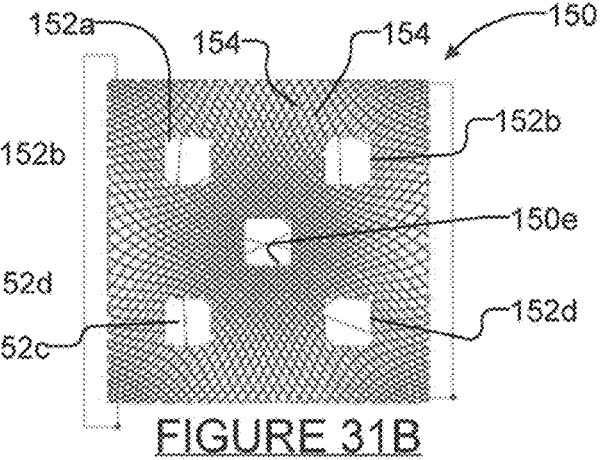
FIG. 31B shows juxtaposed toolpaths for layers A and B for the five-hole plate problem.

In this example, we solve a five-hole plate 150 problem with forces and dimensions shown in FIG. 29. The holes 152a-152e are squares with sides lengths of 3 mm. The hole 152e boundary at the center of the plate 150 is fixed u(x)=0. The line loads $f_a=(-\hat{e}_1+\hat{e}_2)$ kN/mm, $f_b=(-\hat{e}_1-\hat{e}_2)$ kN/mm, $f_c=(\hat{e}_1-\hat{e}_2)$ kN/mm and $f_d=(\hat{e}_1+\hat{e}_2)$ kN/mm are applied at the four corners of the plate 150. The plate 150 in this example has 12 layers with an ABAB AB stacking sequence for a total of 98 design parameters. The finite element mesh contains 19200 elements of size 1 mm×1 mm×0.3 mm and the volume fraction limit is $v_{max}=0.7$. In FIG. 30B, we show a shortest continuous toolpath 154 generated by solving the TSP for the layer A. The total length of the continuous toolpath generated by the TSP is 1804 mm, which is 8% shorter than the one toolpath 154' obtained by the zigzag method that is 1953 mm, as indicated in FIG. 30A. FIG. 31 shows the continuous toolpath 154 obtained for the layer B of the plate 150 and the juxtaposed toolpaths 154 of the two layers. As expected, the toolpaths 154 are closer in the regions around the central hole 150e and where the forces are applied.

Figure 32A:
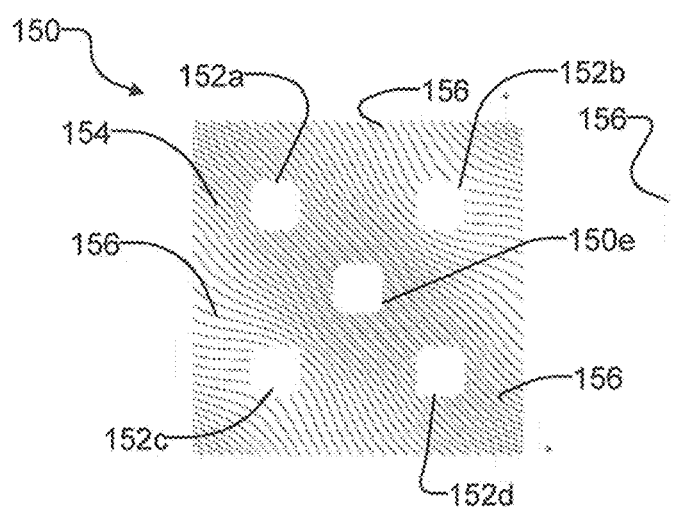
FIG. 32A illustrates a modified TSP solution toolpath for the layer A for the five-hole plate problem.
Figure 32B:
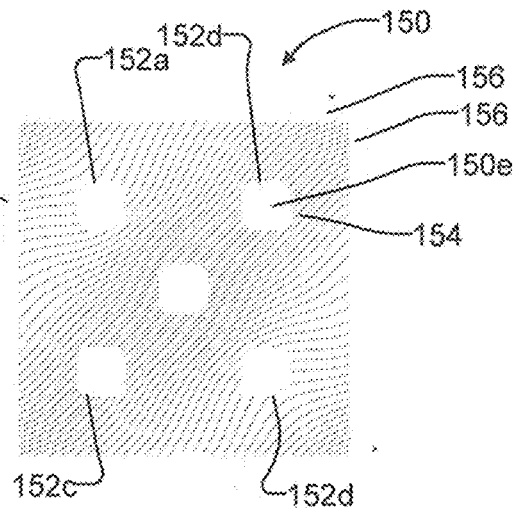
FIG. 32B shows a modified TSP solution toolpath for the layer B for the five-hole plate problem.

If we modify the TSP distance definitions, results will vary accordingly. For instance, to avoid crossing the holes, we penalize the distance of non adjacent cities that are on the hole boundaries. We impose $c_{j,k}=\infty$ if $x_j \in \partial P_i^{Hr}$, $x_k \in \partial P_i^{Hr}$ and cities (j) and (k) are non adjacent. In FIG. 32, we show the solution of this modified TSP using the 5 hole plate 150. As expected, the toolpaths 154 avoid crossing the holes 150a-150e, however, extra connections 156 between non adjacent cities at the external boundary appear.

Figure 33:
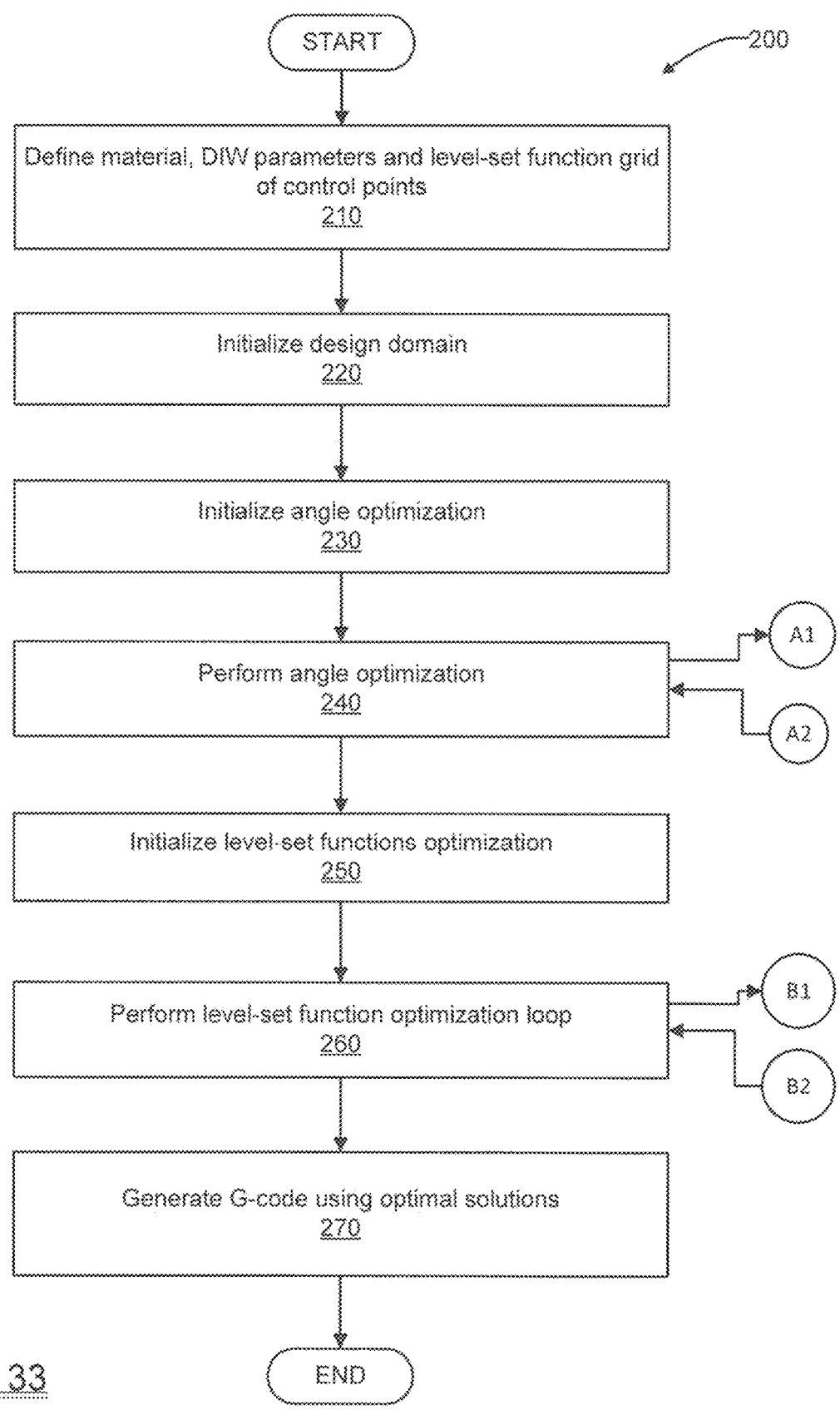
FIG. 33 shows a high level flowchart to provide a high level summary of major operations performed by the system of FIG. 1 in determining optimum toolpaths for each layer of an AM manufactured structure.

Referring to FIG. 33, a high level flowchart 200 is shown to provide a high level summary of major operations described herein, which are performed by the modules 28, 30 and 32 of the optimization subsystem 24 (FIG. 1). At operation 210, initial actions may include defining material parameters (transversely isotropic stiffness parameters: Young's moduli (plural), shear moduli, Poisson's ratios, density, etc., as well as DIW parameters (b, $l_{max}$, $r_{min}$, h, $v_{max}$) and a level-set function grid of control points. These operations may involve the designer inputting various information on the parameters into the part design parameters module 26. At operation 220 the electronic controller 20 may initialize a design domain. At operation 230 the electronic controller 20 may initialize an angle optimization, and then perform an angle optimization routine using the angle optimization module 30 at operation 240. At operation 250 the electronic controller 20 may initialize a level-set functions optimization, and then at operation 260 perform a level-set function optimization loop using the level-set function optimization module 28. Finally, the electronic controller 20 may use the G-code generating module 32 at operation 270 to generate G-code using optimal solutions. The G-code is the code that may be applied to the motion control subsystem 34 to control movement of the nozzle in each of X, Y and Z (Z being up and down) movements to form each layer of the structure in a layer-by-layer operation.

Figure 33A:
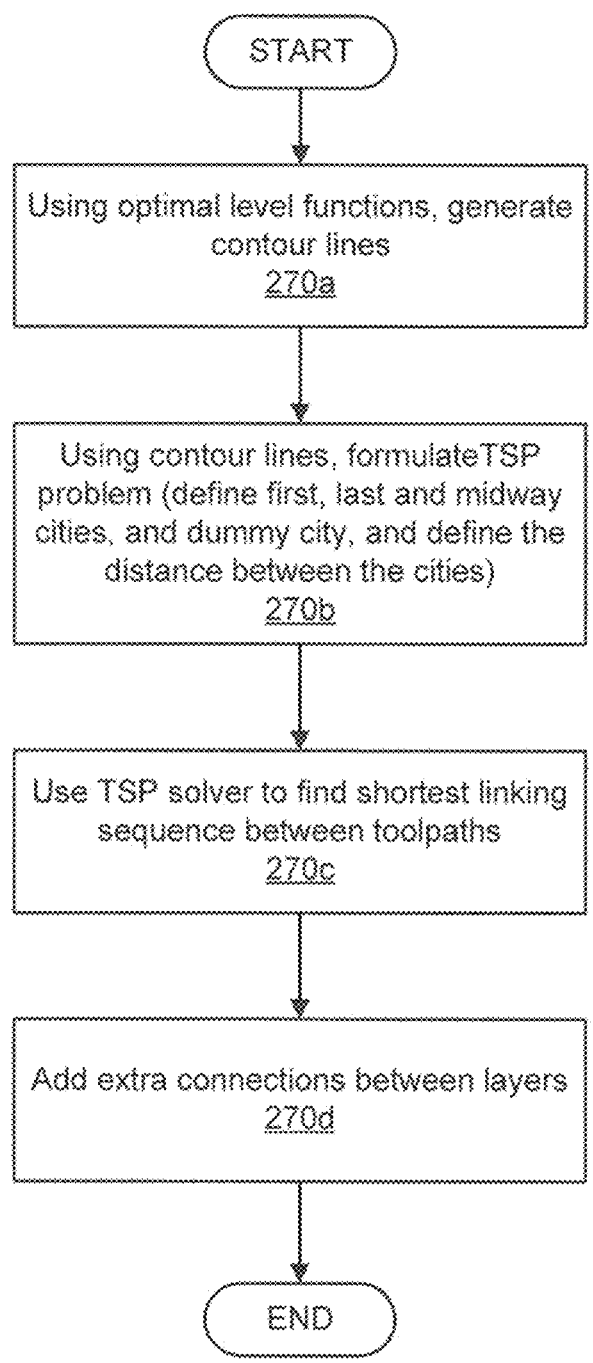
FIG. 33A is a flowchart showing in greater detail the sub-operations that may be performed in generating the G-code.

Referring to FIG. 33A, the various sub-operations performed at the G-code generation operation 270 are shown. At operation 270a, using optimal level-set functions, contour lines may be generated. At operation 270b, using the contour lines, the TSP problem may then be formulated. This may involve defining first, last and midway cities, along with a dummy city, and also defining the distance between cities. At operation 270c, the TSP solver may be used to find the shortest linking sequence between toolpaths. At operation 270d, extra connections between layers may then be added.

Figure 34:
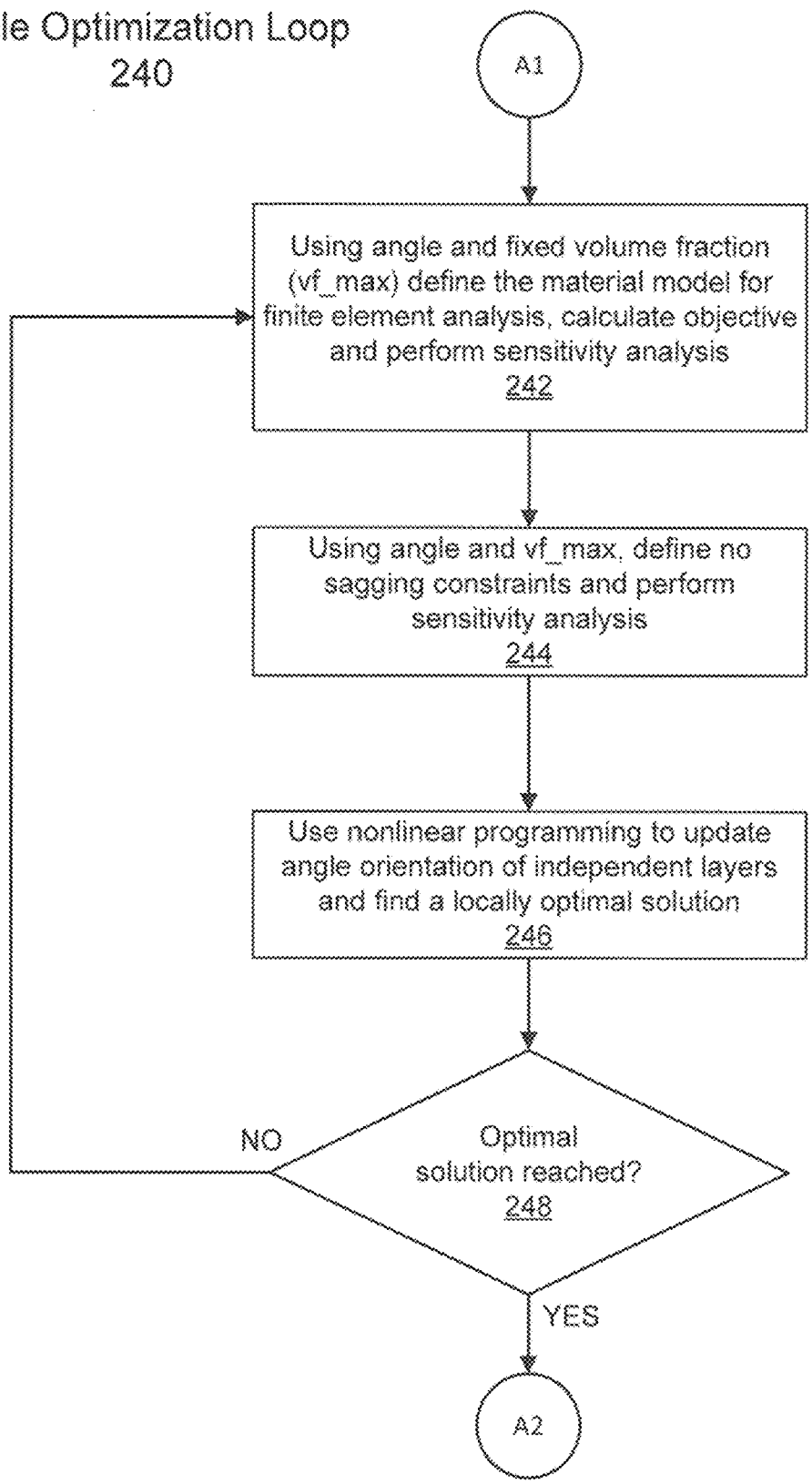
FIG. 34 shows a more detailed flowchart of various operations that may be performed in the angle optimization loop of FIG. 33, by the angle optimization module of FIG. 1.
Figure 35:
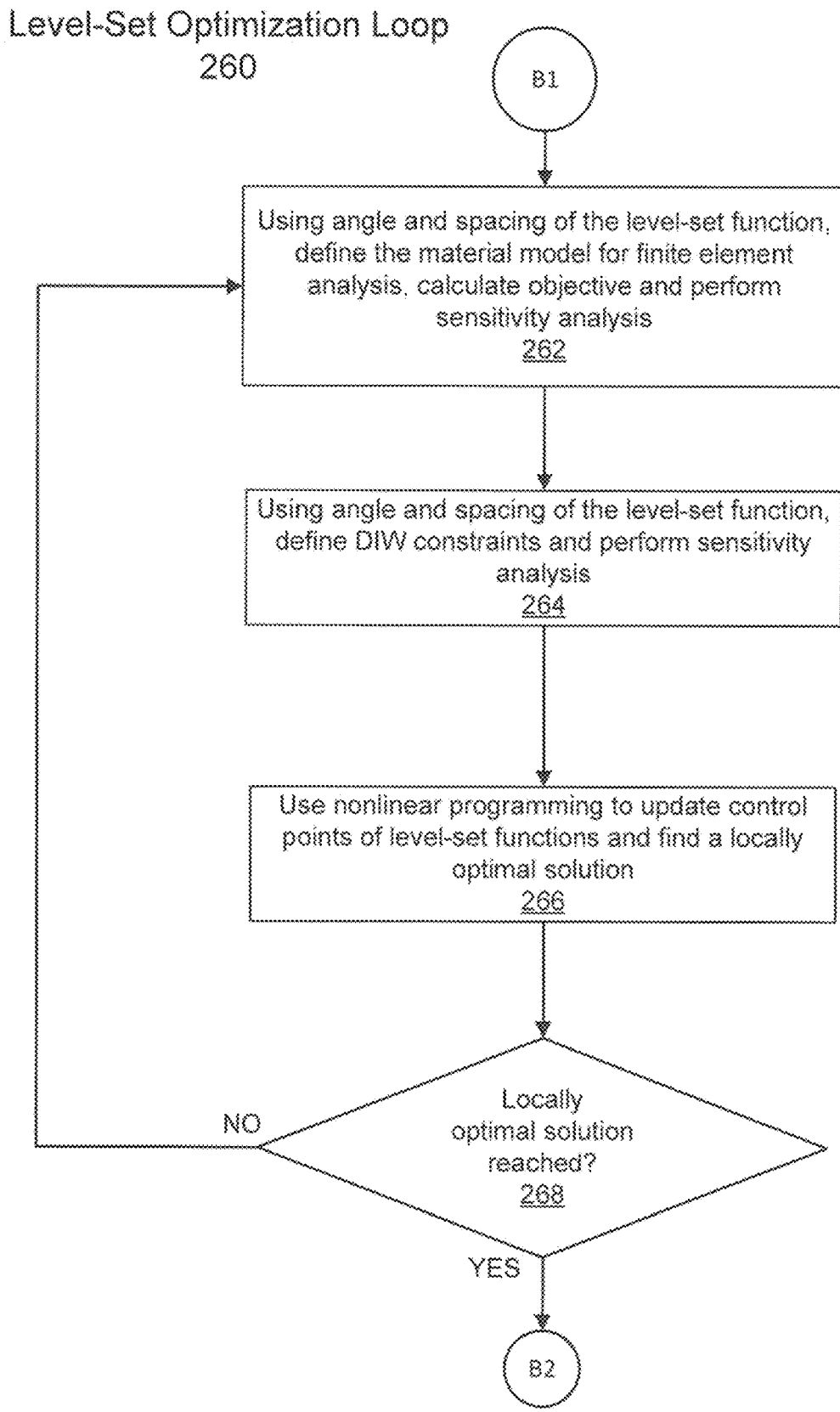
FIG. 35 shows a more detailed flowchart of various operations that maybe performed in the level-set optimization loop of FIG. 33, by the level-set function optimization module of FIG. 1.

Referring briefly to FIGS. 34 and 35, more detailed descriptions of various sub-operations performed by the angle optimization module 30 and the level-set function optimization module 28 will be described. Referring initially to FIG. 34, various sub-operations that may be performed at the angle optimization loop operation 240 (from FIG. 33) are shown. At operation 242, using angle and fixed volume fraction ($v_{max}$), the material model may be defined for finite element analysis, to calculate an objective and to perform a sensitivity analysis. At operation 244, using angle and $v_{max}$, no sagging constraints may be defined and a sensitivity analysis may then be performed by the electronic controller 20. At operation 246, nonlinear programming may be used by the electronic controller 20 to update angle orientation of independent layers and to find a locally optimal solution. At operation 248 the electronic controller 20 may check if an optimal solution has been reached, and if not, then operations 242-248 may be repeated until a "Yes" answer is reached at operation 248.

Referring to FIG. 35, a summary of the operations performed by the level-set function optimization module 28 in carrying out the level-set optimization loop 260 in FIG. 33 is presented. Initially at operation 262, using angle and spacing of the level-set function, a material model is defined for finite element analysis, the objective is calculated and a sensitivity analysis is performed. At operation 264, using angle and spacing of the level-set function, DIW constraints are defined and a sensitivity analysis is performed. At operation 266, nonlinear programming is used by the electronic controller 20 to update control points of level-set functions and to find a locally optimal solution. At operation 268 a check is made to determine if a locally optimal solution has been reached, and if not, operations 262-268 are repeated until a "Yes" answer is obtained at operation 268.

Referring to FIG. 33A, a summary of operations performed by the G-code generator module 32 in carrying out G-code generation loop 270 in FIG. 33 is presented. Using optimal level-set functions, we generate contour lines defined by Equation 1. Using these contour lines, we formulate TSP problem. To do this we define the first, last and midway cities of each contour line. We also define the dummy city and the distances between the cities using Equations 38, 39 and 40. We use a TSP solver to find shortest linking sequence between toolpaths in order to minimize printing time. We add extra connections between layers and make a continuous toolpath for the whole structure. Thus, G-code is generated.

The present disclosure thus demonstrates a system and method for optimizing FRC structures fabricated by AM that accommodates manufacturability constraints of the DIW process, maintains computational efficiency, and guarantees optimality. The toolpaths of each layer are defined by the contours of a level-set function. With this parameterization, the toolpaths are continuous and defined with a small number of design variables in a fixed, predetermined grid independent of the finite element mesh used for structural analysis. The toolpath spacing, angle and curvature are defined with the gradient of the level-set function. In this way, it is easy to impose DIW manufacturing constraints such as no overlap, no sag, minimum radius of curvature, and toolpaths continuity. For each layer, these local constraints are enforced globally, using a ramp function, resulting in a small number of constraints.

The DIW toolpaths affect the orientation of the reinforce fibers and hence the structural response of the composite structure. We model the material properties, i.e., the volume fraction and elastic stiffness using the level-set function parametrization. This allow the system 10 to compute a structure's mass and compliance as well as their design sensitivities via the finite element method. This is combined with nonlinear programming to efficiently update the design parameters and find locally optimal solutions.

The optimized toolpaths start and finish at the boundary of each layer. To minimize manufacturing cost, the present disclosure formulates and solves a TSP to obtain the shortest continuous toolpath for each layer which avoids overlap and crossing holes. This continuous toolpath is subsequently used to generate the G-code for the CNC fabrication of the 3D structure or part.

The approaches described herein have been validated through examples by obtaining minimum compliance composite structures which can be readily fabricated. In one example, results were validated by fabricating and testing.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for optimizing an additive manufacturing (AM) process, comprising:
 a printing component for using a material to form a component in a layer-by-layer process;
 a motion control subsystem for controlling movement of at least one of the printing component or a substrate on which the component is being formed;

an electronic controller for controlling the movement of one of the printing component or a substrate on which the component is being formed, in a manner to optimize a toolpath for the printing component as each layer of the component is formed;

an optimization subsystem configured to:
  enable manufacturability constraints of a printing process to be defined;
  define optimized toolpaths for each layer of the component using contours of a level set function;
  use the optimized toolpaths to generate code for controlling movement of the printing component relative to the substrate such that the code defines a shortest continuous toolpath for each said optimized toolpath of a given said layer that avoids overlap of any portion of the optimized toolpath within a given said layer, and which helps to optimize at least one selected property of a finished component made using the system; and
  the electronic controller configured to use the code to control the motion control subsystem to move one of the printing component or the substrate, in accordance with the optimized toolpaths, to create the component in a layer-by-layer operation.

2. The system of claim 1, wherein the optimization subsystem implements the level set function such that toolpath spacing, angle and curvature are defined with the level set function.

3. The system of claim 1, wherein the optimization subsystem enables at least one of the following group of manufacturing constraints to be defined:
  Direct Ink Write (DIW) parameters and constraints;
  a level-set function grid of control points, including a specific number for the control points;
  stiffness of the component; and
  a thickness of printed material b, maximum spacing between adjacent toolpaths $l_{max}$, minimum radius of curvature $r_{min}$, height of layers h, and maximum total volume fraction $v_{max}$.

4. The system of claim 3, wherein the level-set function grid of control points is modeled as a B-surface defined with shape functions and a set of control points, and wherein the shape functions are defined within a fixed grid.

5. The system of claim 1, wherein the optimization subsystem enables the optimized toolpaths for each layer to be generated in part by initializing a design domain operation including:
  defining a design domain;
  defining a layer pattern;
  defining a number of layers of the component and slicing the component into $n_l$ layers; and
  obtaining a finite element mesh for the component.

6. The system of claim 1, wherein the optimization subsystem enables the optimized toolpaths for each layer to be generated in part by initializing an angle optimization operation which includes defining optimization parameters including at least one of tolerances, a maximum number of iterations, a maximum spacing between adjacent toolpaths $l_{max}$, and a volume fraction $v_{max}$.

7. The system of claim 6, wherein the initializing an angle optimization operation further comprises defining an initial angle orientation for each one of a plurality of predetermined number of layers of the component.

8. The system of claim 1, wherein the optimization subsystem performs an angle optimization loop which includes using angle and fixed volume fraction ($v_{max}$) to define a material model for finite element analysis.

9. The system of claim 1, wherein the optimization subsystem performs an angle optimization loop which includes using angle and $v_{max}$ to define no sagging constraints.

10. The system of claim 9, wherein the optimization subsystem performs a sensitivity analysis to compute sensitivities of the objective function, including compliance, and sensitivities of the no sagging constraints with respect to design parameters including angle orientations of the toolpaths of the independent layers.

11. The system of claim 1, wherein the optimization subsystem performs an angle optimization loop which includes using nonlinear programming to update angle orientations of independent layers and to find a locally optimal solution.

12. The system of claim 1, wherein the optimization subsystem performs an initialize level set functions optimization operation which includes:
  generating initial level set function control points using optimal angles; and
  defining the level set functions using a B-surface constructed with bi-cubic B-splines.

13. The system of claim 1, wherein the optimization subsystem performs a level-set optimization loop which includes:
  using angle and spacing of the level-set function to define printing constraints including at least one of;
  a minimum separation of toolpaths;
  no turns exceeding a minimum radius of curvature; and
  a constraint to minimize sagging of a flowable material after initially being deposited by the printing component; and
  furthermore using angle and spacing of the level-set function, and material properties, to define a volume fraction and a stiffness of the component.

14. The system of claim 3, wherein the optimization subsystem performs a sensitivity analysis to compute sensitivities of the objective function, including compliance, and sensitivities of the DIW constraints with respect to design parameters, which include control points.

15. The system of claim 13, wherein the optimization subsystem performs the level-set optimization loop to further include performing a non-linear programming operation to update control points of level-set functions and find a local optimal solution.

16. The system of claim 1, wherein the code comprises G-code, and wherein the optimization subsystem generates the G-code by using a plurality of operations comprising:
  using optimal level-set functions to obtain contours that represent toolpaths;
  defining a plurality of cities for each said layer and formulating a Travelling Salesman Problem (TSP) for each said layer of the component; and
  by using a TSP solver configured to obtain the shortest continuous toolpath for each said layer which links the plurality of cities without interruption of the optimized toolpath used for each said layer.

17. The system of claim 1, further comprising using the optimization subsystem to define the component as a distinct predetermined number of layer domains.

18. The system of claim 1, wherein:
  the electronic controller implements a direct ink write (DIW) printing operation, and
  wherein the printing component comprises a nozzle through which a flowable printing material is flowed and deposited on at least one of the substrate or a previously formed material layer.

19. The system of claim 1, wherein:
the electronic controller implements a selective laser sintering process; and
wherein the printing component comprises a laser controlled by the electronic controller to heat select portions of a powdered material bed deposited on the substrate.

20. A system for optimizing an additive manufacturing (AM) process, comprising:
a printing nozzle for printing a flowable material to form a component in a layer-by-layer printing process;
a motion control subsystem for controlling movement of at least one of the printing nozzle or a substrate on which the component is being formed;
an electronic controller for controlling the movement of one of the printing nozzle or a substrate on which the component is being formed, in a manner to optimize a toolpath for the printing nozzle as the flowable material is deposited on the substrate or on a previously formed layer;
an optimization subsystem to:
enable manufacturability constraints of a printing process to be defined;
define optimized toolpaths for each layer of the component using contours of a level set function;
define the level set function with a set of control points and polynomial functions that are defined within a fixed grid;
generate the optimized toolpaths for each layer in part by initializing an angle optimization operation which includes defining optimization parameters including at least one of tolerances, a maximum number of iterations and a minimum spacing between adjacent ones of the optimized toolpaths, and wherein the initializing an angle optimization operation further comprises defining an initial angle orientation for each one of a plurality of predetermined number of layers of the component;
using angle and spacing of the level-set function to generate code which defines DIW constraints including no overlapping portion of the optimized toolpath, and such that the code defines a shortest continuous toolpath for the optimized toolpath of each said layer that avoids overlap of any portion of the optimized toolpath within a given said layer, and where the DIW constraints further include at least one of;
no turns exceeding a minimum radius of curvature; and
a constraint to minimize sagging of the flowable material after initially being deposited by the printing nozzle; and
the electronic controller configured to use the code to control the motion control subsystem to move one of the printing nozzle or the substrate, in accordance with the optimized toolpaths, to create the component in a layer-by-layer operation.

21. A method for carrying out and optimizing an additive manufacturing (AM) process, comprising:
using an electronic controller to control movement of one of a printing component or a substrate, in a manner to optimize a toolpath for the printing component as the printing component forms a layer of a component;
using an optimization subsystem to:
enable manufacturability constraints of a printing process to be defined;
define optimized toolpaths for each layer of the component using contours of a level set function, wherein the level set function is defined using a fixed, predetermined grid;
use the optimized toolpaths to generate code for controlling movement of the printing component relative to the substrate such that the code defines a shortest continuous toolpath for each said layer that avoids overlap of any portion of the optimized toolpath within a given said layer, and which helps to optimize at least one property of a finished component made using the method; and
to cause the electronic controller to use the code to control movement of one of the printing component or the substrate, in accordance with the optimized toolpaths, to create the component in a layer-by-layer operation.

\* \* \* \* \*